United States Patent
Junior et al.

(10) Patent No.: US 12,314,878 B2
(45) Date of Patent: May 27, 2025

(54) CUSTOMER SERVICE TICKET SIMILARITY DETERMINATION USING UPDATED ENCODING MODEL BASED ON SIMILARITY FEEDBACK FROM USER

(71) Applicant: Dell Products L.P., Round Rock, TX (US)

(72) Inventors: Norton Zamboni Junior, Porto Alegre (BR); Fagner Scheibel Reinaldo, Porto Alegre (BR); Aline Rodrigues da Cruz, Porto Alegre (BR); Vinicius Michel Gottin, Rio de Janeiro (BR); Romulo Teixeira de Abreu Pinho, Niteroi (BR); Paulo Acassio Martins Oliveira, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 18/078,626

(22) Filed: Dec. 9, 2022

(65) Prior Publication Data

US 2024/0193506 A1 Jun. 13, 2024

(51) Int. Cl.
*G06Q 10/06* (2023.01)
*G06N 3/09* (2023.01)
*G06Q 10/0631* (2023.01)

(52) U.S. Cl.
CPC ....... *G06Q 10/063114* (2013.01); *G06N 3/09* (2023.01)

(58) Field of Classification Search
CPC .................................................. G06Q 10/06

USPC .......................................................... 705/7.15
See application file for complete search history.

(56) References Cited

U.S. PATENT DOCUMENTS

| | | | |
|---|---|---|---|
| 11,593,580 B1 * | 2/2023 | Harper | G06K 7/1417 |
| 2006/0046842 A1 * | 3/2006 | Mattice | G07F 17/3202 463/29 |
| 2012/0221474 A1 * | 8/2012 | Eicher | G09C 5/00 705/26.1 |

(Continued)

OTHER PUBLICATIONS

Q. V. Le and T. Mikolov, "Distributed Representations of Sentences and Documents," arXiv, vol. https://arxiv.org/abs/1405.4053, 2014.

*Primary Examiner* — Nga B Nguyen
(74) *Attorney, Agent, or Firm* — Ryan, Mason & Lewis, LLP

(57) ABSTRACT

Techniques are provided for customer service ticket similarity determination using an updated encoding model based on similarity feedback from a user. One method comprises obtaining encodings of customer service tickets in a vector space using an encoding model; determining pairwise similarities for the encodings of the customer service tickets; obtaining feedback from a user regarding the pairwise similarities for a subset of the encodings; updating pairwise similarities for the subset of the encodings using the feedback from the user; generating an updated encoding model by processing the updated pairwise similarities for the subset of the encodings of the customer service tickets using a supervised learning algorithm; and processing at least one customer service ticket based at least in part on the updated encoding model. The feedback from the user may indicate a similarity of two or more of the plurality of customer service tickets.

20 Claims, 17 Drawing Sheets

(56) References Cited

U.S. PATENT DOCUMENTS

| | | | |
|---|---|---|---|
| 2023/0186052 A1* | 6/2023 | Wong | G06N 3/08 706/15 |
| 2023/0412475 A1* | 12/2023 | Sobolev | H04L 41/065 |

* cited by examiner

CUSTOMER SERVICE TICKET SIMILARITY DETERMINATION USING UPDATED ENCODING MODEL BASED ON SIMILARITY FEEDBACK FROM USER

FIELD

The field relates generally to information processing systems, and more particularly to the processing of customer service tickets in such information processing systems.

BACKGROUND

Customer support requests are often documented using tickets. In the field of IT (Information Technology), for example, a ticketing system is often used to manage IT tickets. There is often a large number of duplicate and/or otherwise related tickets. For example, in the IT context, related tickets are often encountered when a server fails, or when a failure occurs with a single sign-on process. In these types of situations, a number of users will typically submit independent customer support requests, with many users often describing the nature of the request differently, although the root cause for the multiple requests is often the same or at least related.

SUMMARY

In one embodiment, a method comprises obtaining encodings of a plurality of customer service tickets in a vector space using an encoding model, wherein the encodings of the plurality of customer service tickets are generated using a self-supervised learning algorithm; determining pairwise similarities for at least a subset of the encodings of the plurality of customer service tickets; obtaining feedback from a user regarding at least some of the pairwise similarities for the subset of the encodings; updating one or more of the pairwise similarities for the subset of the encodings of the plurality of customer service tickets using at least some of the feedback from the user; generating an updated encoding model by processing the updated pairwise similarities for the subset of the encodings of the plurality of customer service tickets using a supervised learning algorithm; and processing at least one customer service ticket based at least in part on the updated encoding model.

In one or more embodiments, the obtaining the encodings of the plurality of customer service tickets in the vector space further comprises obtaining tokenized versions of the plurality of customer service tickets. The feedback from the user regarding the at least some pairwise similarities for the subset of the encodings may indicate a similarity of two or more of the plurality of customer service tickets.

In some embodiments, the generating the updated encoding model comprises, for a given training epoch of a plurality of training epochs, obtaining a batch of customer service tickets from the plurality of customer service tickets; transforming the batch of customer service tickets into encodings using a current encoding model; determining pairwise similarities for the encodings of the batch of customer service tickets; generating a first aggregate similarity value obtained from the pairwise similarities for the encodings of the batch of customer service tickets; generating a second aggregate similarity value obtained from the pairwise similarities for the encodings of the corresponding customer service tickets in the plurality of customer service tickets; and evaluating a loss function using the first aggregate similarity value and the second aggregate similarity value and applying a supervised learning algorithm to fit the encoding model with respect to the loss function.

Other illustrative embodiments include, without limitation, apparatus, systems, methods and computer program products comprising processor-readable storage media.

DETAILED DESCRIPTION

Figure 1:
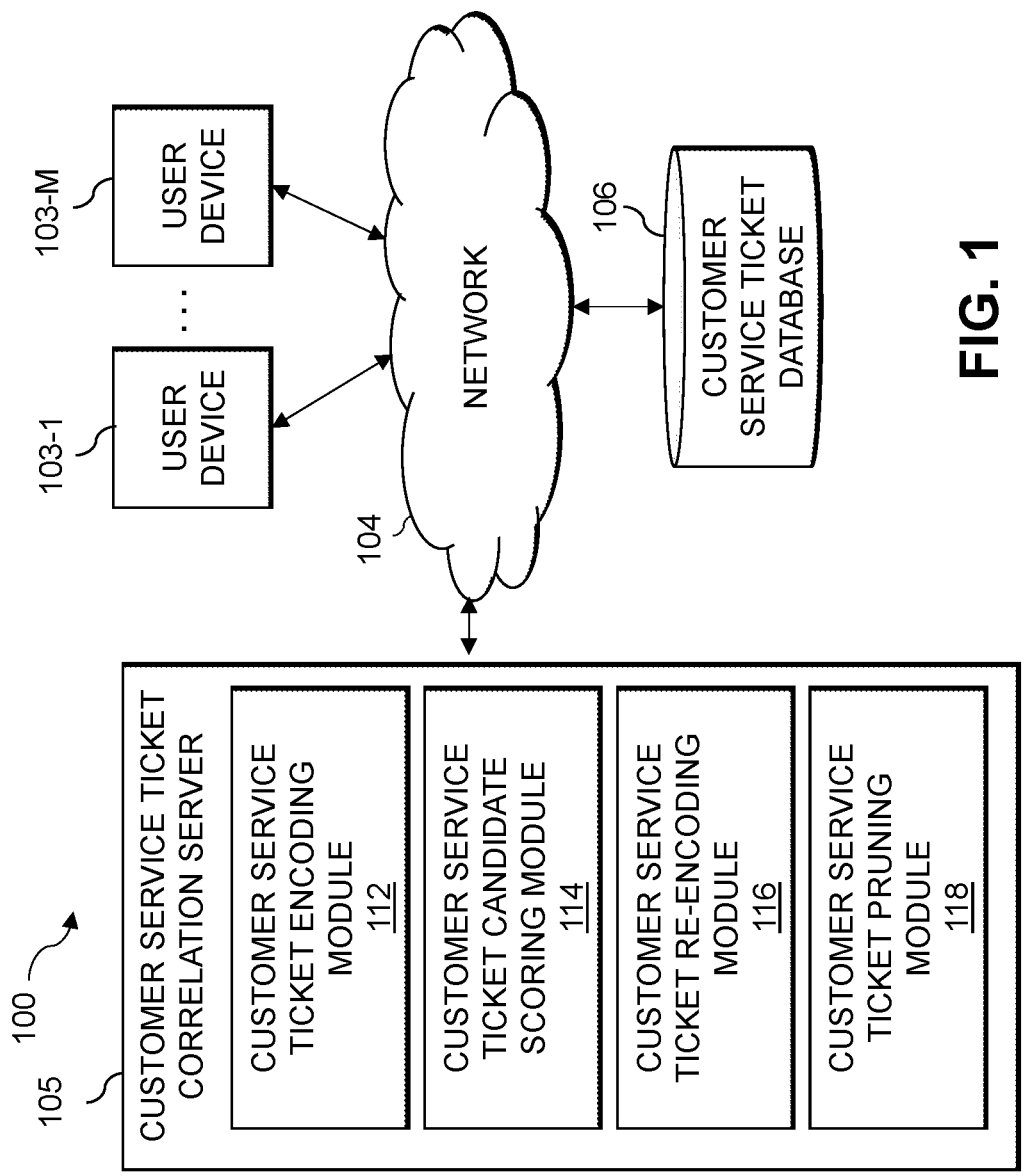
FIG. 1 illustrates an information processing system configured for customer service ticket similarity determination using an updated encoding model in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for customer service ticket similarity determination using an updated encoding model based on similarity feedback from a user.

As noted above, customer support requests are often documented using customer service tickets. Such customer service tickets are often the first interaction between a user requesting support and a team responsible for resolving the support issue. Thus, customer service tickets typically include information that the user believes is relevant for the support analysis.

Although there is often a large number of duplicate and/or otherwise related tickets, it may not be easy for different support ticket operators to identify such duplicate or similar tickets. This kind of situation can delay the pace of work of the support team since someone may be spending some effort resolving something that was previously resolved and the prior solution could be leveraged again.

One or more aspects of the disclosure recognize that the time consumed by such efforts unnecessarily impacts the metrics of a support team, and that knowing that a given customer service ticket is a duplicate (or similar) to a previously resolved customer service ticket would benefit the support team (e.g., by leveraging the prior solution and/or the prior service personnel). In this manner, such customer service tickets can be resolved in a shorter amount of time. Typically, customer service platforms require closing notes for a customer service ticket indicating the steps that were performed to resolve the issues. As used herein, the term "customer service tickets" shall be broadly construed to encompass service data structures, transaction data structures, interaction data structures and other data structures that record information obtained regarding interactions with or on behalf of a user, such as a customer.

In one or more embodiments, the disclosed ticket similarity determination techniques aim to find relationships within the support ticket data so that new incidents are solved more efficiently by leveraging previous solutions. In a typical environment for a support ticket system, the inputs of a user are stored as a ticket entry at a repository. This entry typically comprises multiple fields, such as a unique identifier (ID), a creation timestamp, and textual fields for details. The disclosed ticket similarity determination approach does not require any particular specific set of fields, and is adaptable to any number of fields, such as message and/or note fields that are typically present in such systems.

In at least some embodiments, the disclosed ticket similarity determination framework employs natural language processing techniques that identify support tickets in a database that relate to a newly opened ticket. Overall, the disclosed ticket similarity determination methodology identifies support tickets that have already been closed with a solution by encoding the ticket description and searching for similarities in the encoded space. The most similar previous tickets (e.g., a top N list) can be provided, for example, in a ranked manner, for review by a human operator. The review and analysis of the human operator can then be leveraged to fine-tune the weights of the encoding process for future support issues.

The disclosed ticket similarity determination framework is capable of suggesting previous tickets that are similar to a new ticket without the need for any initial supervised dataset. The framework then leverages available human revision (e.g., feedback from the user indicating whether prior results were accurate), resulting from normal operation guided by the disclosed approach, to adjust the weights of the features in the similarity metric.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more customer service ticket correlation servers 105 and one or more customer service ticket databases 106, discussed below.

The user devices 103 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (StaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary customer service ticket correlation server 105 may comprise a customer service ticket encoding module 112, a customer service ticket candidate scoring module 114, a customer service ticket re-encoding module 116 and a customer service ticket pruning module 118. In some embodiments, the customer service ticket encoding module 112 assigns a numerical vectorial representation to each customer service ticket to encode a respective customer service ticket in an encoded space, as discussed further below in conjunction with FIGS. 2 and 3, for example. The customer service ticket candidate scoring module 114 assigns a similarity score to each customer service ticket, as discussed further below in conjunction with FIGS. 2 and 5, for example. The customer service ticket re-encoding module 116 updates pairwise similarity values for at least some of the customer service tickets using feedback from a user and generates an updated encoding model, as discussed further below in conjunction with FIGS. 7 through 13, for example. The customer service ticket pruning module 118 removes tickets from the customer service ticket database 106 that satisfy one or more ticket pruning criteria.

It is to be appreciated that this particular arrangement of elements 112, 114, 116, 118 illustrated in the customer service ticket correlation server 105 of the FIG. 1 embodiment is presented by way of example only, and alternative arrangements can be used in other embodiments. For example, the functionality associated with elements 112, 114, 116, 118 in other embodiments can be combined into a single element, or separated across a larger number of elements. As another example, multiple distinct processors can be used to implement different ones of elements 112, 114, 116, 118 or portions thereof.

At least portions of elements 112, 114, 116, 118 may be implemented at least in part in the form of software that is stored in memory and executed by a processor. An exemplary process utilizing elements 112, 114, 116, 118 of the customer service ticket correlation server 105 in computer network 100 will be described in more detail with reference to FIGS. 2 through 13.

Other customer service ticket correlation servers 105 (not shown in FIG. 1), if any, are assumed to be configured in a manner similar to that shown for customer service ticket correlation server 105 in the figure.

The customer service ticket correlation server 105 may be implemented, for example, on the cloud, such as a private cloud, or on the premises of an enterprise or another entity. In some embodiments, the customer service ticket correlation server 105, or portions thereof, may be implemented as part of a host device.

Additionally, the customer service ticket correlation server 105 can have an associated customer service ticket database 106 configured to store, for example, information related to one or more customer service tickets, as discussed further below.

The customer service ticket database 106 in the present embodiment is implemented using one or more storage systems associated with the one or more customer service ticket correlation servers 105. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more user devices 103 and/or customer service ticket correlation servers 105 may be implemented on a common processing platform, or on separate processing platforms. The one or more user devices 103 may be configured to interact over the network 104 in at least some embodiments with the one or more customer service ticket correlation servers 105, for example.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and/or customer service ticket correlation servers 105 to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more user devices 103 and/or customer service ticket correlation servers 105 can be one or more input-output devices (not shown), which illustratively comprise keyboards, displays or other types of input-output devices in any combination. Such input-output devices can be used, for example, to support one or more user interfaces to the customer service ticket correlation servers 105, as well as to support communication between the customer service ticket correlation servers 105 and other related systems and devices not explicitly shown.

The one or more user devices 103 and/or customer service ticket correlation servers 105 in the FIG. 1 embodiment are assumed to be implemented using at least one processing device. Each such processing device generally comprises at least one processor and an associated memory, and implements one or more functional modules for controlling certain features of the respective device.

More particularly, the one or more user devices 103 and/or customer service ticket correlation servers 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises RAM, read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more user devices 103 and/or customer service ticket correlation servers 105 to communicate in some embodiments over the network 104 with each other (as well as one or more other networked devices), and illustratively comprises one or more conventional transceivers.

It is to be understood that the particular set of elements shown in FIG. 1 for customer service ticket similarity determination using an updated encoding model based on similarity feedback from a user is presented by way of illustrative example only, and in other embodiments additional or alternative elements may be used. Thus, another embodiment includes additional or alternative systems, devices and other network entities, as well as different arrangements of modules and other components.

Text encoding (e.g., word encoding and sentence encoding) approaches are typical of natural language processing tasks in machine learning literature. These approaches allow numerical representations of textual tokens (e.g., words) in vector form such that similar words are closer in the vector space. A number of text encoding techniques are available. Doc2vec, for example, is based on the word2vec approach and requires no explicit labeling. Doc2vec relies on distributional semantics and obtains, from a corpus of texts, numeric representations of documents.

Figure 2:
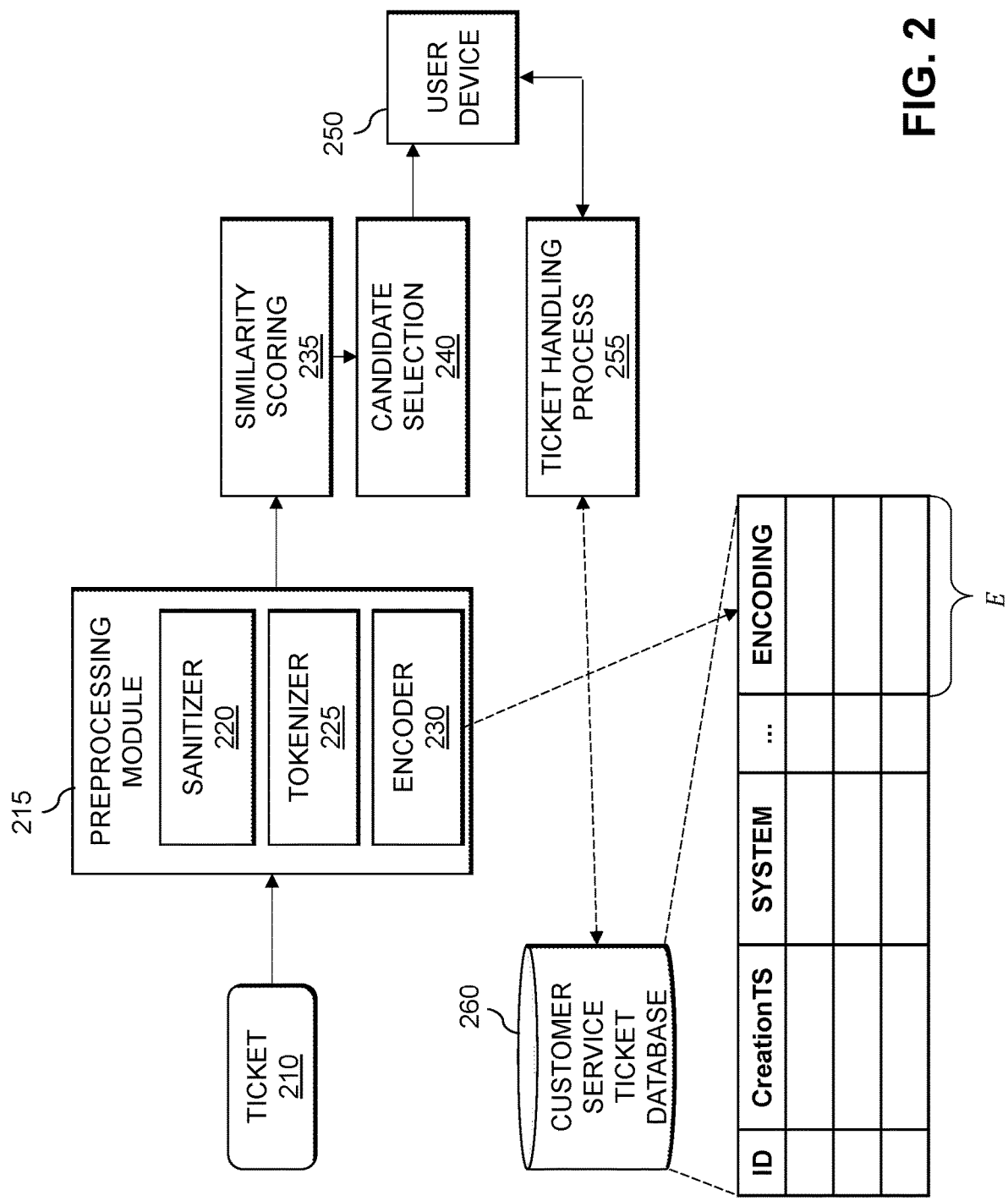
FIG. 2 illustrates an exemplary processing of customer service tickets to identify similar customer service tickets that have been previously resolved in accordance with an illustrative embodiment.

FIG. 2 illustrates an exemplary processing of customer service tickets to identify similar customer service tickets that have been previously resolved in accordance with an illustrative embodiment. A user typically enters the necessary information for a given customer service ticket which is stored as a ticket entry in a customer service ticket database 260. Each support ticket item contains a textual description of the problem and other relevant identification fields. In the example of FIG. 2, a such customer service tickets may comprise a ticket identifier, a creation timestamp, and a system identifier. The ticket entry may track the status of the ticket in a ticket handling process 255, for example, as being open, updated or closed, with a timestamp indicating an amount of time since changing to a current status. In addition, the disclosed ticket similarity determination techniques recognize that the operator(s) (of the ticket handling process 255) often annotate the ticket entry with notes, typically relating to the resolution (e.g., closing) of the request.

The customer service ticket database 260 provides a source for the similarity searching framework and includes descriptions of previously closed support tickets and indications of the actions taken to resolve them. Since descriptions are provided in natural language, errors within and across support tickets may occur. The disclosed solution thus includes a pre-processing step to clean and standardize the textual representation of the database fields that will be involved in the similarity searches.

A given customer service ticket 210 is applied to a preprocessing module 215 that operates over information input by the user, and outputs the original ticket information in an encoded format (e.g., an embedding). The preprocessing module 215 formats the contents of each customer service ticket and comprises a sanitizer 220, a tokenizer 225 and an encoder 230. The sanitizer 220 may remove certain stop words. For example, the sanitizer 220 may format the data so that encodings, accent marks, whitespace and punctuation are changed/removed in a uniform fashion. Data normalization tasks may also be employed, such as: substituting contractions for the corresponding long form expression of each contraction; stemming and lemmatization of terms, by substituting them for the root or base word, such as in verbs changed into the radical/base form (e.g., "allowed" to "allow") and modal adverbs changed into the base term (e.g., "happily" to "happy", "quickly" to "quick"); the removal of specified stop words (e.g., "is", "a", "this", "the"). The sanitizer 220 provides a reduced set of terms (with respect to variation) so that in the tokenization of the sanitized text the same token is assigned to semantically similar terms.

The tokenization process performed by the tokenizer 225 converts the text of each customer service ticket to textual tokens (e.g., obtaining a token for each resulting word in the sentence). In the case of the tickets in the customer service ticket database 260 that are closed and/or have additional text fields provided by operators, the context of such text may be appended to the description for the purposes of generating the resulting tokens.

Figure 3:
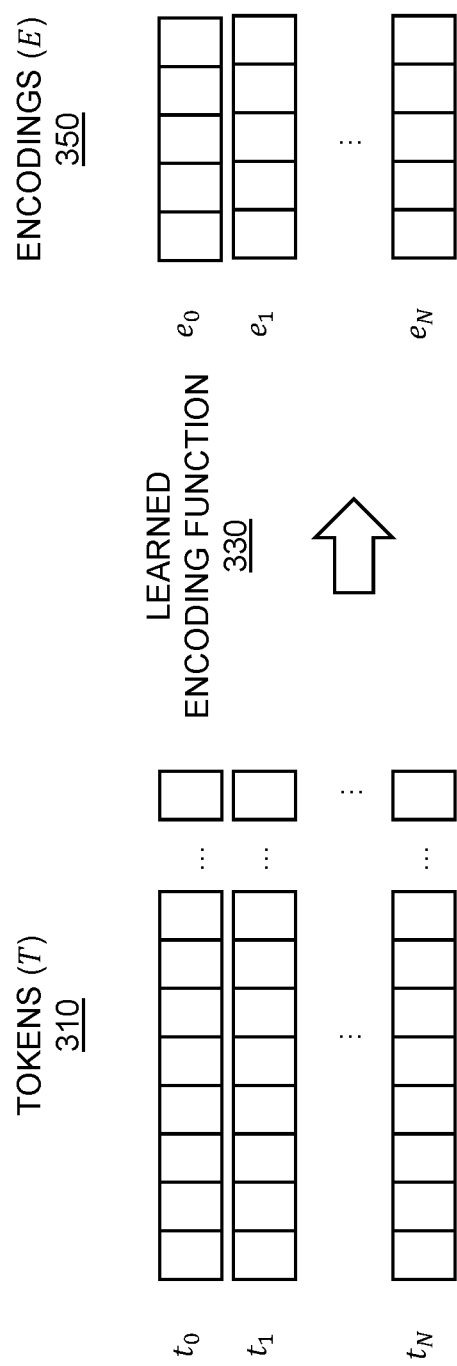
FIG. 3 illustrates a learned encoding function that generates encodings from tokenized descriptions of each customer service ticket in accordance with an illustrative embodiment.

The resulting set of tokens $t_i$ of each ticket is encoded by an encoding algorithm employed by the encoder 230 that assigns a numerical vectorial representation to each customer service ticket to encode a respective customer service ticket in an encoded space. This numerical representation determines features of the ticket, which determines the dimension of the encoded vector. FIG. 3 illustrates a learned encoding function 330 that generates encodings, E, 350 from the tokenized descriptions, t, 310 of each ticket, where $e_i$ represents the encoding of the i-th ticket in accordance with an illustrative embodiment. The encoder 230 may employ, for example, a doc2vec approach that trains a neural network to learn the learned encoding function 330 from a corpus of text, such that words that occur in similar contexts are codified into a similar vectorial representation, conditioned by unique document identifications.

A candidate scoring stage searches the historical data in the customer service ticket database 260 of FIG. 2 for similar prior customer service tickets (in the encoded space), using similarity scoring 235, discussed further below in conjunction with FIGS. 4 and 5, and presents them to an operator on a user device 250 for candidate selection 240, as discussed further below in conjunction with FIG. 6. The disclosed ticket similarity determination approach further comprises an encoding revision stage, in which the annotations of correct/incorrect candidate suggestions from the operator are leveraged to fine-tune the candidate scoring step for future iterations, as discussed further below. A ticket handling process stores the processed ticket and the appropriate operator notes in the customer service ticket database 260.

Figure 4:
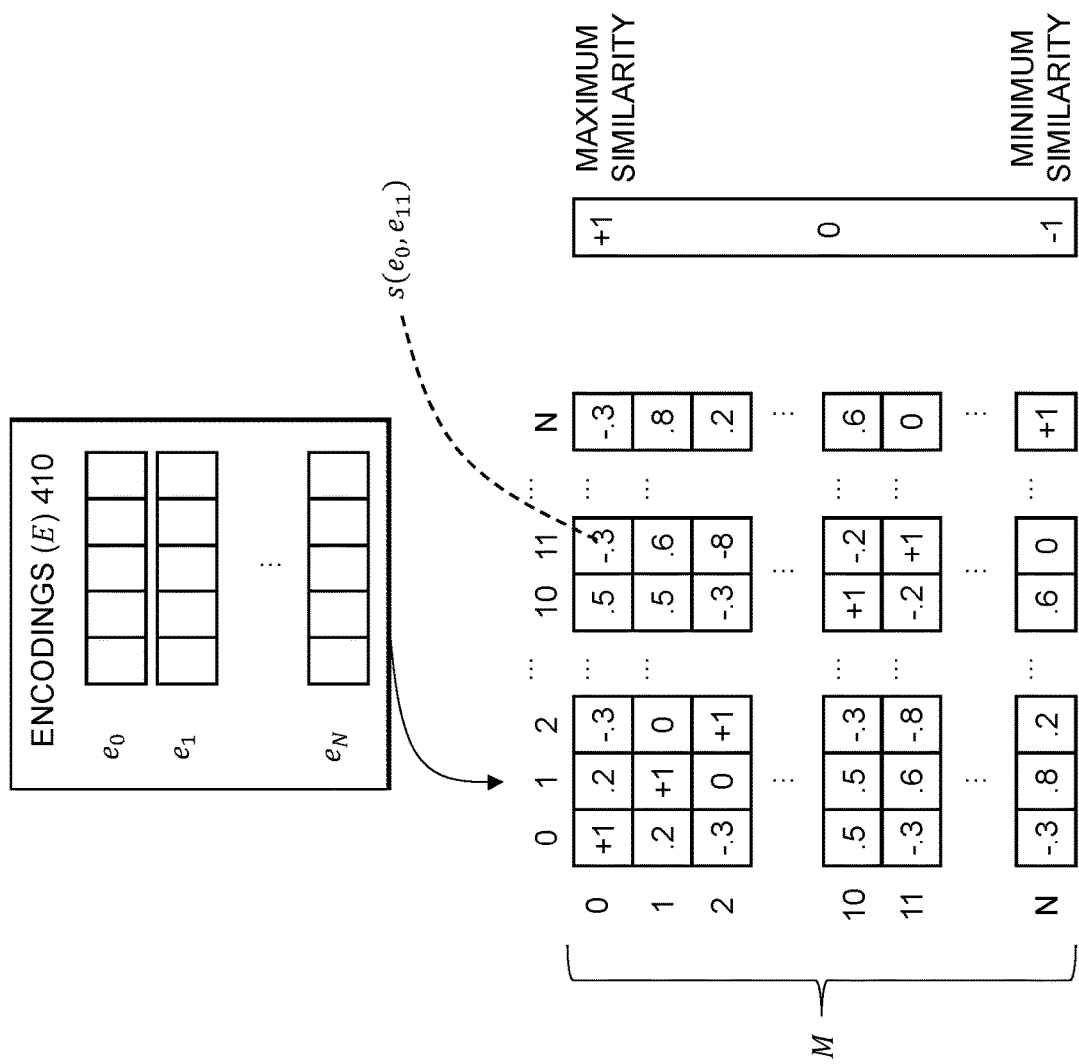
FIG. 4 illustrates a similarity matrix, M, comprising the pairwise similarities of encodings, E, from tokenized descriptions of customer service tickets, t, in accordance with an illustrative embodiment.

FIG. 4 illustrates a similarity matrix, M, comprising the pairwise similarity of the encodings, E, 410 from the tokenized descriptions of each customer service ticket, t, in accordance with an illustrative embodiment. The similarity matrix, M, comprises a row and a column for each customer service ticket and the pairwise similarity is obtained between each customer service ticket.

Each element i, j in the matrix, M, is computed as follows:

$$M_{i,j} = s(e_i, e_j),$$

where s is a similarity function in the encoded space (typically, cosine similarity). In FIG. 4, the similarity between encodings $e_0$ and $e_{11}$ is highlighted. The main diagonal reflects that all tickets are maximally similar to themselves (as expected from a coherent encoding scheme). The matrix, M, is symmetric, which can be exploited in some embodiments to reduce the computational complexity and the storage size of the resulting structure (e.g., the similarity $s(e_i, e_j) \equiv s(e_j, e_i)$).

Figure 5:
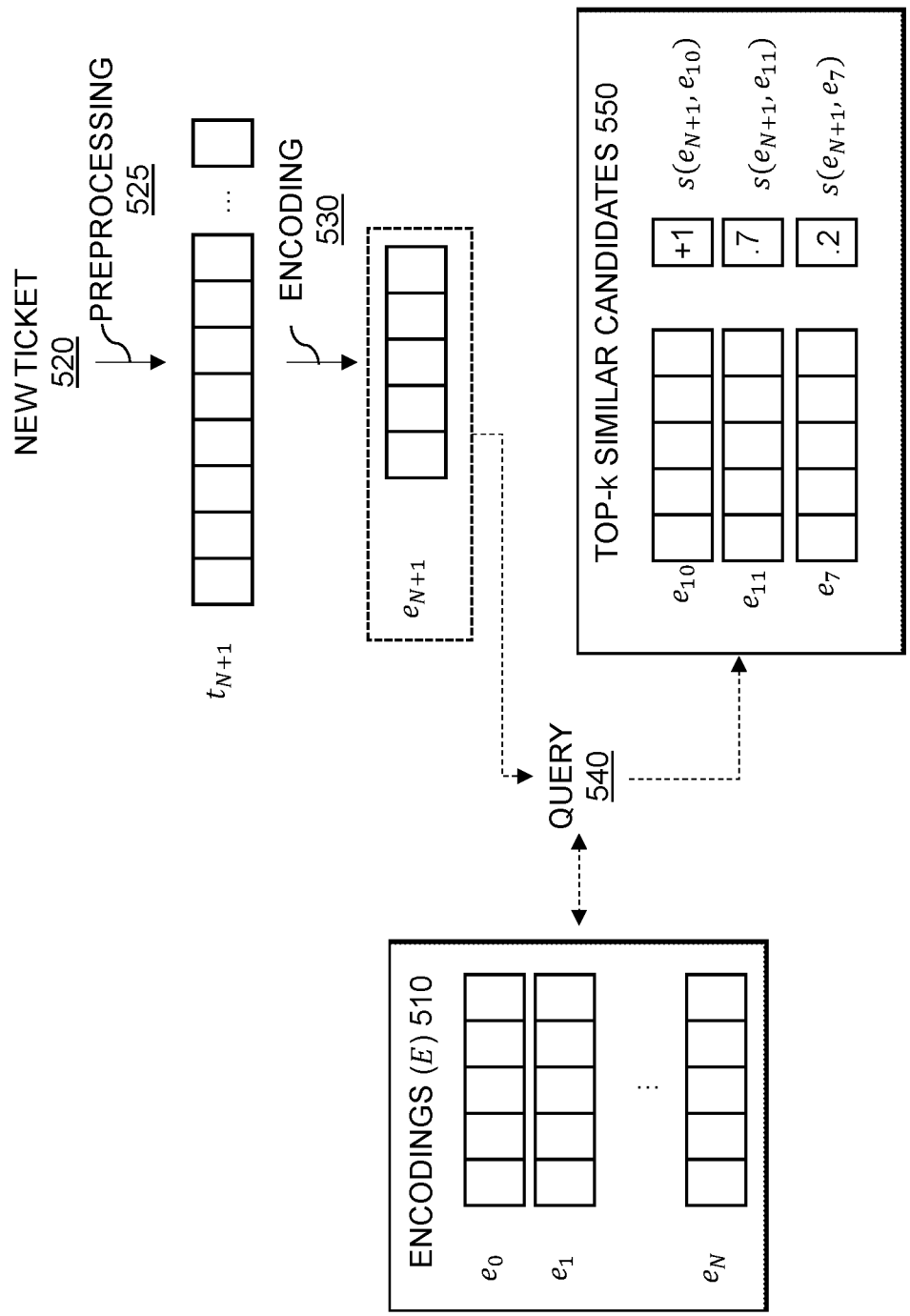
FIG. 5 illustrates an encoding of a new customer service ticket and a query to identify similar previously processed customer service tickets in accordance with an illustrative embodiment.

FIG. 5 illustrates an encoding of a new customer service ticket 520 and a query 540 to identify similar previously processed customer service tickets in accordance with an illustrative embodiment. In the example of FIG. 5, the new customer service ticket 520 is preprocessed at stage 525 to generate a tokenized representation, $t_{N+1}$, of the new customer service ticket 520. The new customer service ticket 520 is then encoded at stage 530 to generate a corresponding encoding, $e_{N+1}$, in a similar manner as discussed above in conjunction with FIG. 2.

An operator submits a query 540 to identify, for example, a set 550 of the top-k most similar candidate customer service tickets (e.g., the k nearest neighbors (k-NN)) relative to the query element in the vectorial space of the description text encoding of the encoding, $e_{N+1}$ of the new customer service ticket 520. In the example of FIG. 5, the three most similar tickets to the new customer service ticket 520 are tickets with index (in the customer service ticket database, and therefore, the similarity matrix, M) 10, 11, and 7.

In at least some embodiments, the query 540 uses the same similarity metric s in the vectorial space as was used to determine the similarity matrix, M (again, typically, the cosine similarity), and determines which items of the database of customer service tickets are most similar to the query item.

It is noted that the encoding of the new customer service ticket 520 is performed over the description (as no closing notes and other textual fields are available). Thus, the computed similarity score considers similarity between description and closing notes interchangeably. This may result in false-positive similarities, but may also determine (correct) similarities between a new customer service ticket and an old customer service ticket when the solution to the old customer service ticket is similar to the description of the new customer service ticket.

Figure 6:
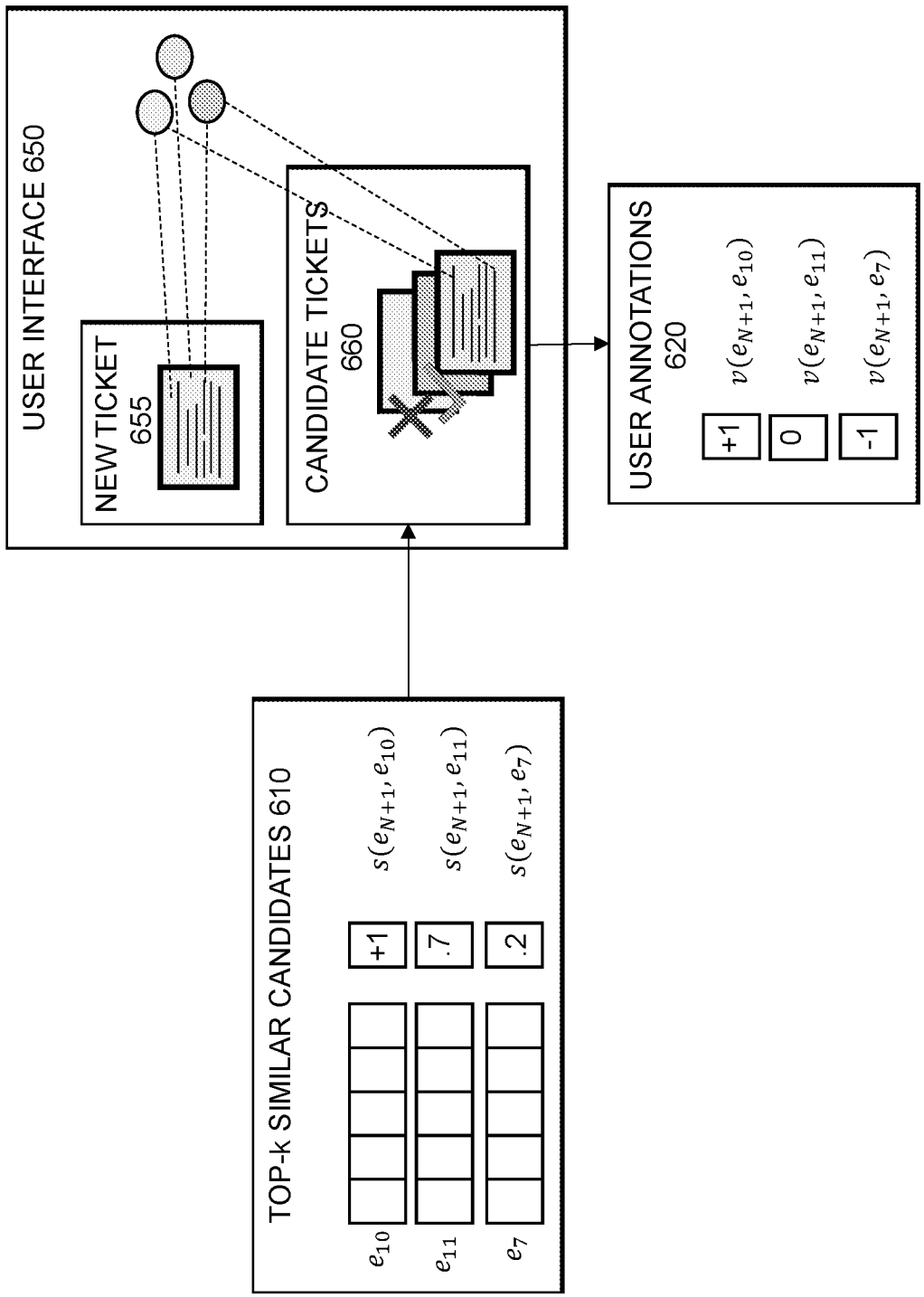
FIG. 6 illustrates a presentation of a set of most similar candidate customer service tickets to a user on a user interface as a set of candidate tickets in accordance with an illustrative embodiment.

FIG. 6 illustrates a presentation of a set 610 of the top-k most similar candidate customer service tickets to a user on a user interface 650 (e.g., a graphical user interface) as a set of candidate tickets 660 in accordance with an illustrative embodiment. The candidate tickets are presented to the operator review and analysis with respect to a new customer service ticket 665. The user interface 650 may comprise functionality for the candidate tickets 660 to be compared to the new customer service ticket 655 in a coordinated (e.g., guided) manner. In addition, the user interface 650 may provide a variety of functionalities to streamline and facilitate the identification of similar concepts/contents between the new customer service ticket 655 and the candidate tickets 660, as would be apparent to a person of ordinary skill in the art. The operator may optionally provide user annotations 620 (e.g., manual labels as ground truth), for example, in the form of positive or negative indications. The annotation $v(e_i, e_j)$ by the operator informs whether $e_i$ and $e_j$ are similar. Thus, the operator may indicate which, if any, of the candidate tickets 660 are semantically related (typically, referring to a same issue, knowledge base article, solution or escalation process) to the new customer service ticket 655.

The operator may then work on the new customer service ticket 655, or resolve it, adding new textual data to the ticket entry (e.g., "closing notes"). The re-encoding of the new customer service ticket 655 is dealt with to account for the added textual information in the triggering or scheduling of the re-encoding process, discussed further below.

Figure 7:
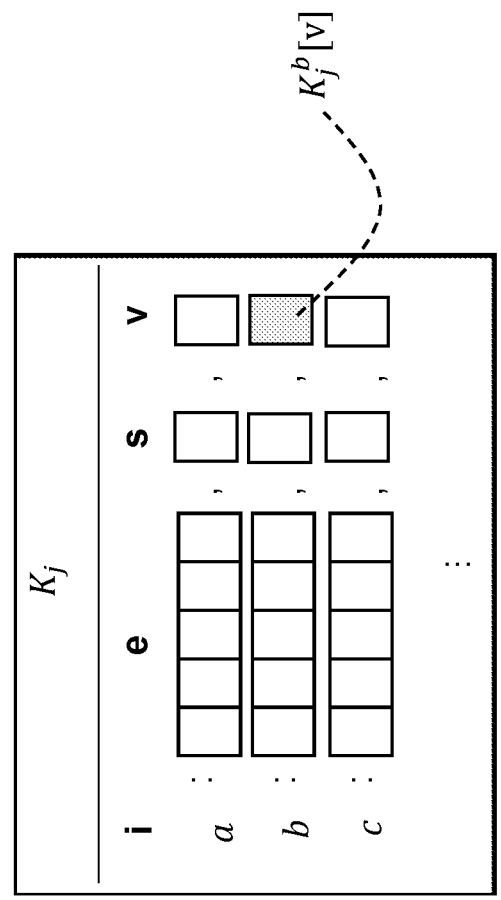
FIG. 7 illustrates a representative data structure that records candidate customer service tickets with feedback provided by an operator regarding an accuracy of pairwise similarity values in accordance with an illustrative embodiment.

FIG. 7 illustrates a representative data structure, $K_j$, that holds the top-k similar candidates with any added labels provided by the annotation process of FIG. 6 for a new customer service ticket, $t_j$ (j>N).

The structure holds tuples (e, s, v) indexed by i, in which:
i is the index of the candidate ticket (a, b, c, in the example of FIG. 7) in the customer service ticket database (and therefore in the similarity matrix, M);
e is the encoding $e_i$;
s is the similarity $s(e_j, e)$; and
v is the "ground truth" provided annotation of similarity between customer service tickets.

The indexing notation $K_j^a$ represents the first tuple in $K_j$; and $K_j^a[e]$, $K_j^a[s]$, and $K_j^a[v]$ to represent fields e, s, and v the tuple, respectively. FIG. 7 highlights the notation v to refer to the operator annotation provided for the similarity between tickets $t_j$ and $t_b$.

These annotations v provide a form of labelling for a weakly-supervised revision of the encoding, as described below.

In typical embodiments, the values of v may be constrained between −1 and 1 (with 1 meaning similarity, −1 meaning no similarity, and 0 representing absent annotation). Different configurations are possible (e.g., in which normalized values between 0 and 1 are possible). Below, this typical embodiment is considered for an adjustment of the similarity matrix, M.

Figure 8:
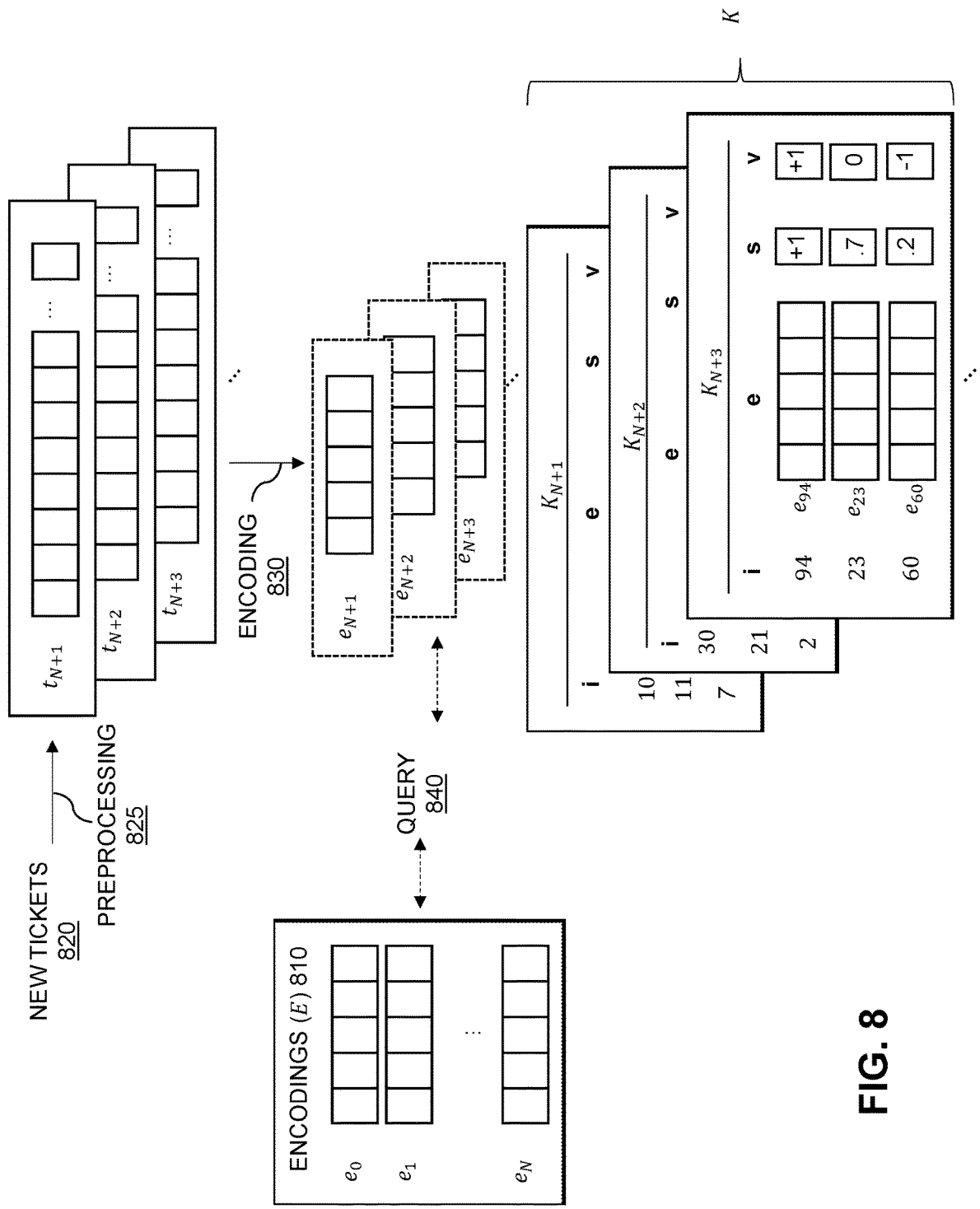
FIG. 8 illustrates a batch processing of a set of new customer service tickets and a query to identify similar previously processed customer service tickets in accordance with an illustrative embodiment.

FIG. 8 illustrates a batch processing of a set of new customer service tickets 820 and a query 840 against encodings 810 to identify similar previously processed customer service tickets in accordance with an illustrative embodiment. In the example of FIG. 8, each new customer service ticket 820 is preprocessed at stage 825 to generate a tokenized representation, $t_{N+1}$, of the respective new customer service ticket 820. Each new customer service ticket 820 is then encoded at stage 830 to generate a corresponding encoding, $e_{N+1}$ through $e_{N+3}$, in a similar manner as discussed above in conjunction with FIG. 2.

An operator submits a query 840 to identify, for example, a set K of the top-k most similar candidate customer service tickets (e.g., the k nearest neighbors (k-NN) relative to the query element in the vectorial space of the description text encoding of the encodings, $e_{N+1}$ through $e_{N+3}$, of the new customer service tickets 820. In the example of FIG. 8, the three most similar tickets to each new customer service ticket 820 are presented. For example, the three most similar tickets to the new customer service ticket associated with encoding, $e_{N+3}$, are tickets with index (in the customer service ticket database, and therefore, the similarity matrix, M) 94, 23, and 60.

In at least some embodiments, the query 840 uses the same similarity metric s in the vectorial space as was used to determine the similarity matrix, M (again, typically, the cosine similarity), and determines which items of the database of customer service tickets are most similar to the query item.

The disclosed ticket similarity determination approach recognizes that the initial encoding is learned just from contextual information (accounting for distributional similarity). An encoding revision process refines the initial encoding given the ground truth information provided by the operators when they assign similarity between tickets. Such a revision process may be computationally expensive. Thus, the batch processing approach of FIG. 8 accumulates multiple such revisions/labels in some embodiments, where the update process is only triggered sparingly (for example, weekly or monthly).

In some embodiments, the set K is collected during a time period (e.g., a work week), and then the adjustment and re-encoding processes are triggered during a scheduled downtime of the ticket support system (e.g., the weekend). In this manner, the operation of the ticket support system is not significantly affected by the computational overhead imposed by that process.

The collected new tickets may be collected with additional closing notes. If that is the case, the encoding must be recomputed (with respect to the encoding initially computed for the new tickets during the candidate scoring). It is noted that with the new encodings of the most-similar candidates could be other tickets (e.g., than those originally thought to be similar). The similarity scores can be computed between the new customer service tickets and the originally selected candidates for those tickets, as those are the ones that were "supervised" by a human operator. Thus, the similarities may need to be recomputed to compose the structure K.

Figure 9:
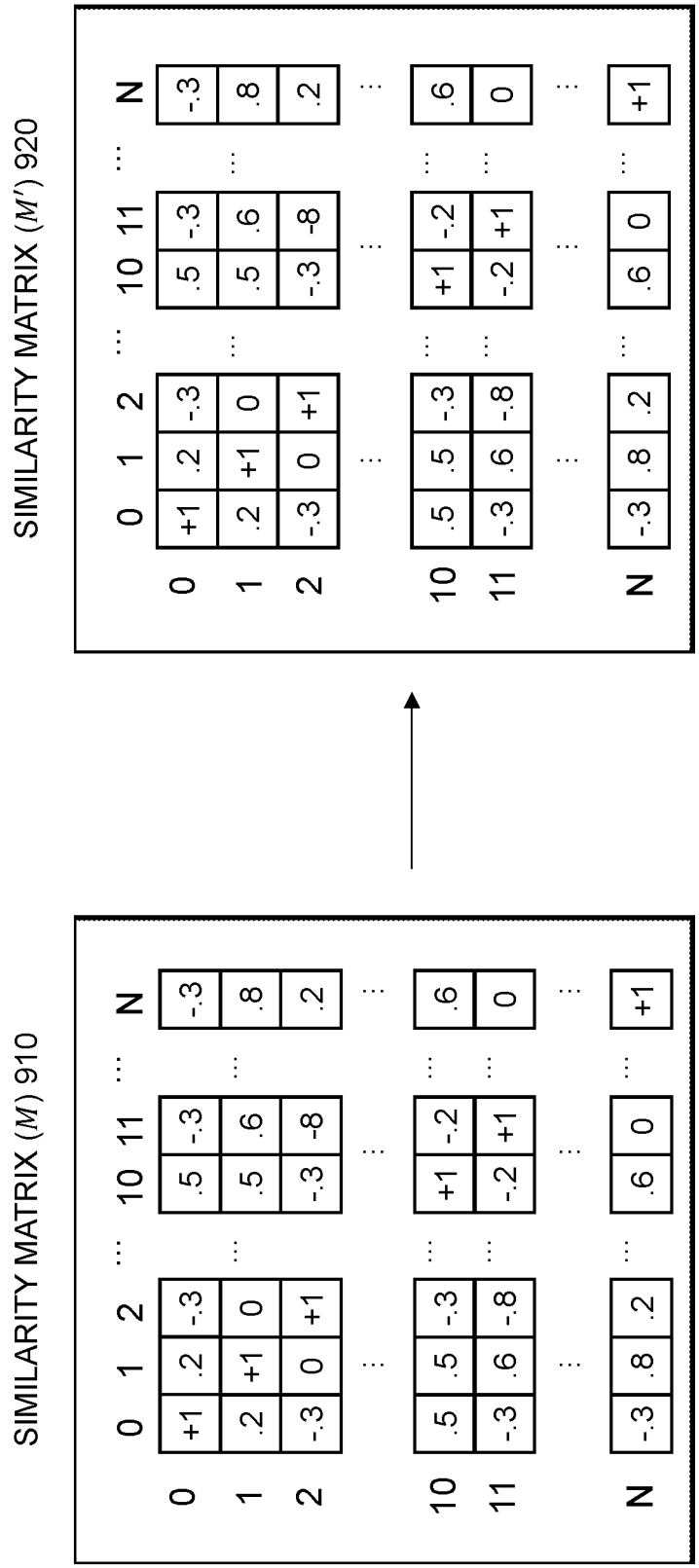
FIG. 9 illustrates a revised similarity matrix where the similarity values have been updated to reflect the annotation information provided an operator in accordance with an illustrative embodiment.

FIG. 9 illustrates a revised similarity matrix where the similarity values have been updated to reflect the annotation information provided an operator in accordance with an illustrative embodiment. In the example of FIG. 9, a similarity matrix (M) 910 comprises an initial set of pairwise similarity values (e.g., prior to the updating based on operator annotations). A revised similarity matrix (M') 920 may be generated, for example, by copying the pairwise similarity values from the similarity matrix (M) 910. In some embodiments, the revised similarity matrix (M') 920 may comprise the same data structure as the initial similarity matrix (M) 910 in memory, with the adjustments performed in-place (i.e., overwriting the structure). The notation of M and M' is adopted as different structures for ease of explanation.

Figure 10:
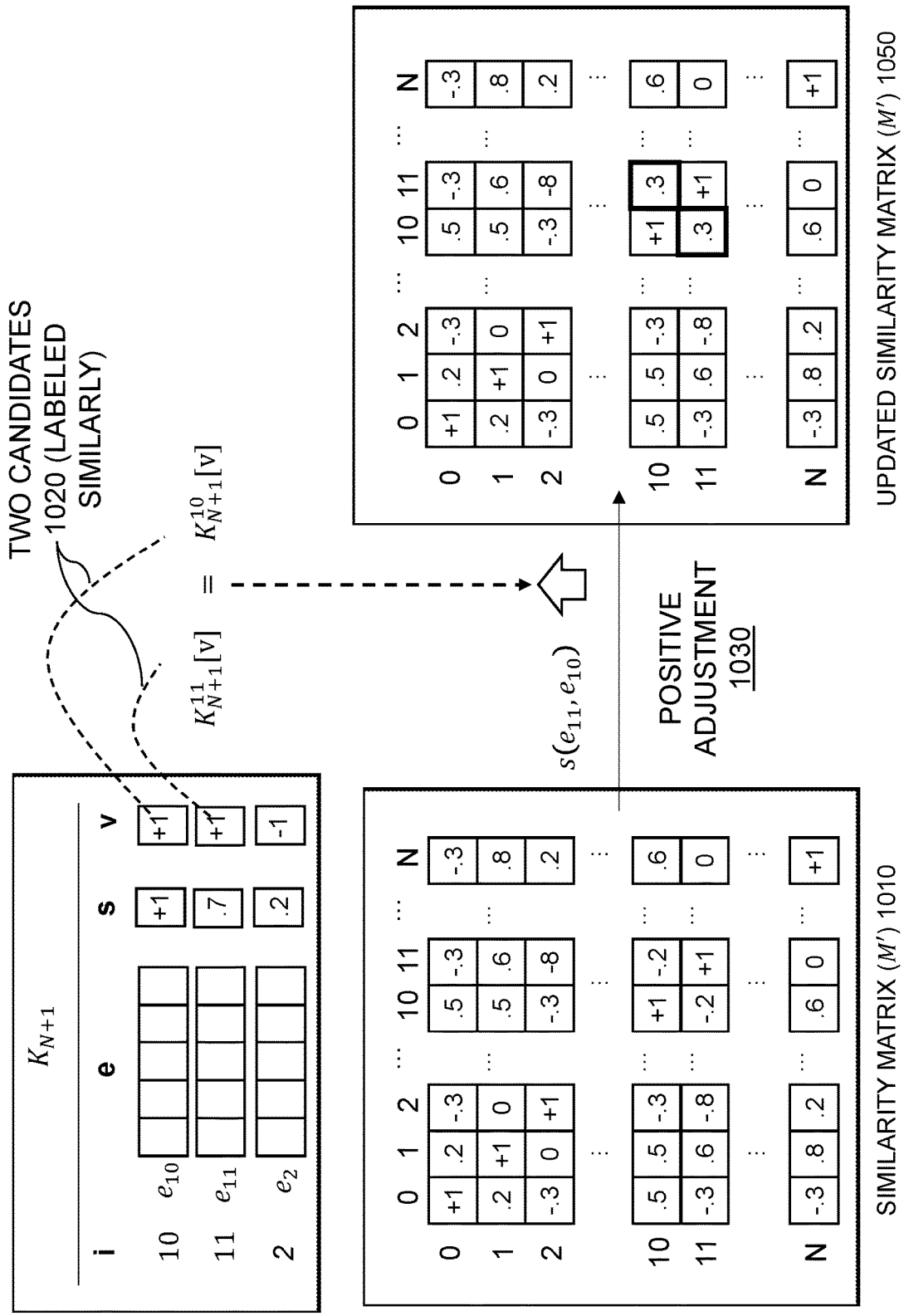
FIGS. 10 and 11 illustrate adjustments of the pairwise similarity values in a similarity matrix based on feedback from an operator regarding an accuracy of pairwise similarity values in accordance with illustrative embodiments.

FIG. 10 illustrates an adjustment of the pairwise similarity values in a similarity matrix (M') 1010 to generate an updated similarity matrix (M') 1050 based on positive feedback from an operator. In the example of FIG. 10, the pairwise similarity values are shown for a representative data structure, $K_{N+1}$, holding added labels, v, provided by the annotation process of FIG. 6 for customer service ticket, $t_{N+1}$. The user annotation indicates that two candidate tickets 1020 with indices 10 and 11 were labeled similarly by the operator to be similar to the new ticket $t_{N+1}$. Thus, the pairwise similarity values, $s(e_{11},e_{10})$, for these two candidate tickets 1020 are incremented with a positive adjustment 1030, relative to the values in the initial similarity matrix (M') 1010, as shown by the dark outline surrounding the cells in the updated similarity matrix (M') 1050 associated with the two candidate tickets 1020 to reflect that the similarity $s(e_{10},e_{11})$ should be greater.

Figure 11:
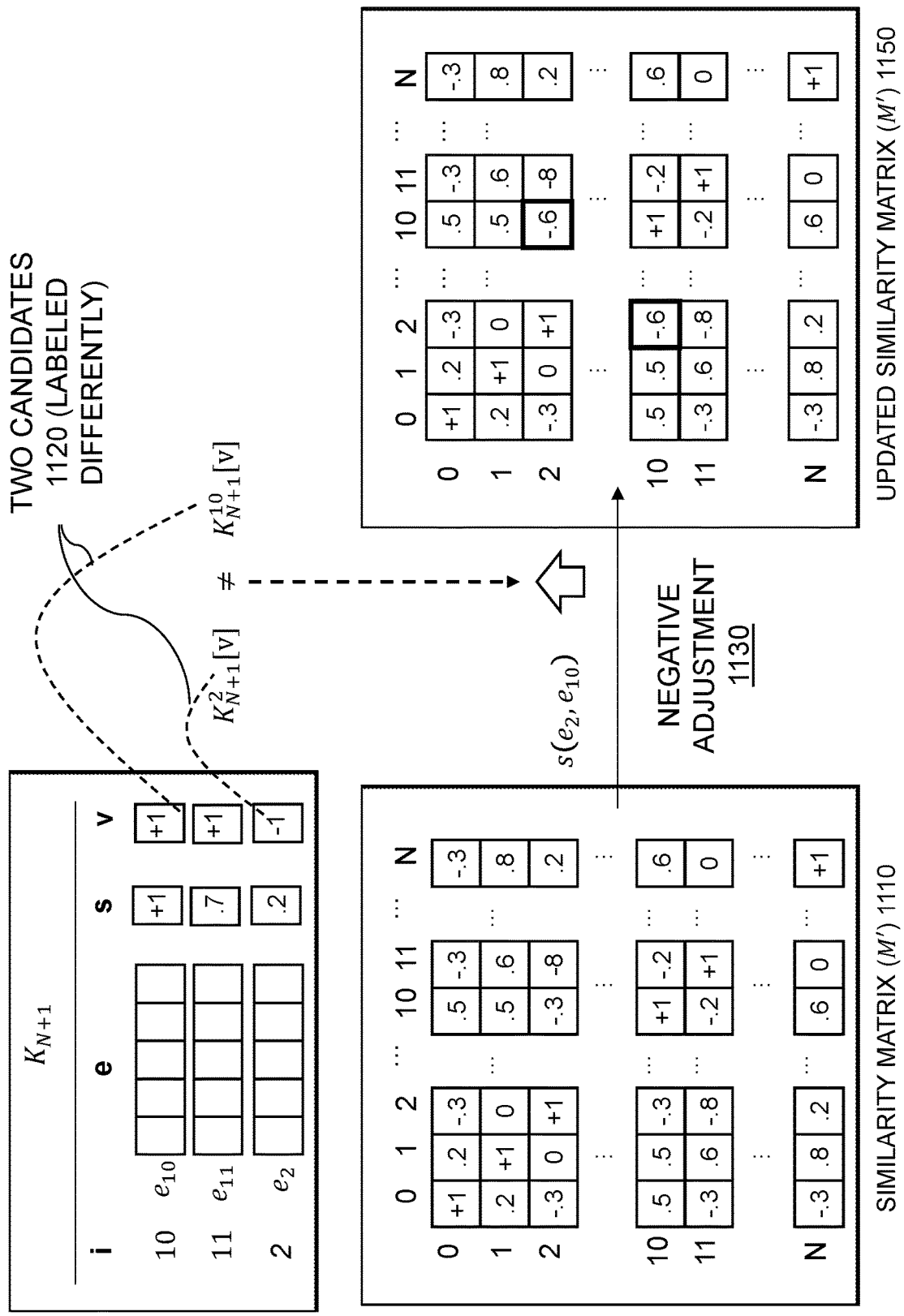

FIG. 11 illustrates an adjustment of the pairwise similarity values in a similarity matrix (M') 1110 to generate an updated similarity matrix (M') 1150 based on negative feedback from an operator. In the example of FIG. 11, the pairwise similarity values are shown for the representative data structure, $K_{N+1}$, holding added labels, v, provided by the annotation process of FIG. 6 for customer service ticket, $t_{N+1}$. The user annotation indicates that two candidate tickets 1120 with indices 2 and 10 were labeled differently by the operator with respect to the new ticket, $t_{N+1}$ (e.g., the candidate ticket with index 10 was labeled to be similar to customer service ticket, $t_{N+1}$, and the candidate ticket with index 2 was labeled to be different than customer service ticket, $t_{N+1}$). Thus, the pairwise similarity values, $s(e_2,e_{10})$, for these two candidate tickets 1120 are decremented with a negative adjustment 1130, relative to the initial similarity matrix (M') 1110 as shown by the dark outline surrounding the cells in the updated similarity matrix (M') 1150 associated with the two candidate tickets 1120 to reflect that the similarity $s(e_{10},e_{11})$ should be smaller.

The adjustments to the pairwise similarity values can be performed for each $K_j \in K$ (and, thus, only once if a single K structure is collected). These steps are represented in FIGS. 10 and 11 with respect to $K_{N+1}$, but recall that they would be repeated also for $K_{N+2}$, $K_{N+3}$, ... in the running example.

The adjustment of the pairwise similarity values in updated similarity matrix (M') 1050, 1150 is performed to account for the differences/similarities across preexisting tickets (in a pairwise manner) in K. The intuitive reasoning is that for a pair of candidate tickets A and B:

If both candidate tickets A and B are considered (by the human operator) to be similar to a new ticket, they are likely similar to each other as well (FIG. 10) so their similarity scores are increased; and If one candidate ticket is considered similar to a new ticket, but the other is not, then the adjustment reinforces that A and B are not similar to each other (FIG. 11) so their similarity scores are decreased.

Formally, an algorithm for this adjustment may be expressed, as follows:

For each $K_j \in K$:
  For each $K_j^a \in K_j$:
    For each $K_j^b \in K_j$, $a \neq b$:
      If $K_j^a[v] = K_j^b[v]$
        Positive adjustment of $M'_{a,b}$ and $M'_{b,a}$
      Else if $K_j^a[v] \neq K_j^b[v]$:
        Negative adjustment of $M'_{a,b}$ and $M'_{b,a}$ Finally, the algorithm above may be adapted to account for cases in which either of the tickets have not been provided a label. In that case, typically no adjustments are applied to the corresponding similarity values in M'. In some embodiments, the similarity may not be changed in the case in which both tickets are negatively labeled—since both being dissimilar to a new ticket does not add enough information regarding their own inter-similarity. The concrete value for the adjustment may be defined in a domain-dependent manner.

Figure 12:
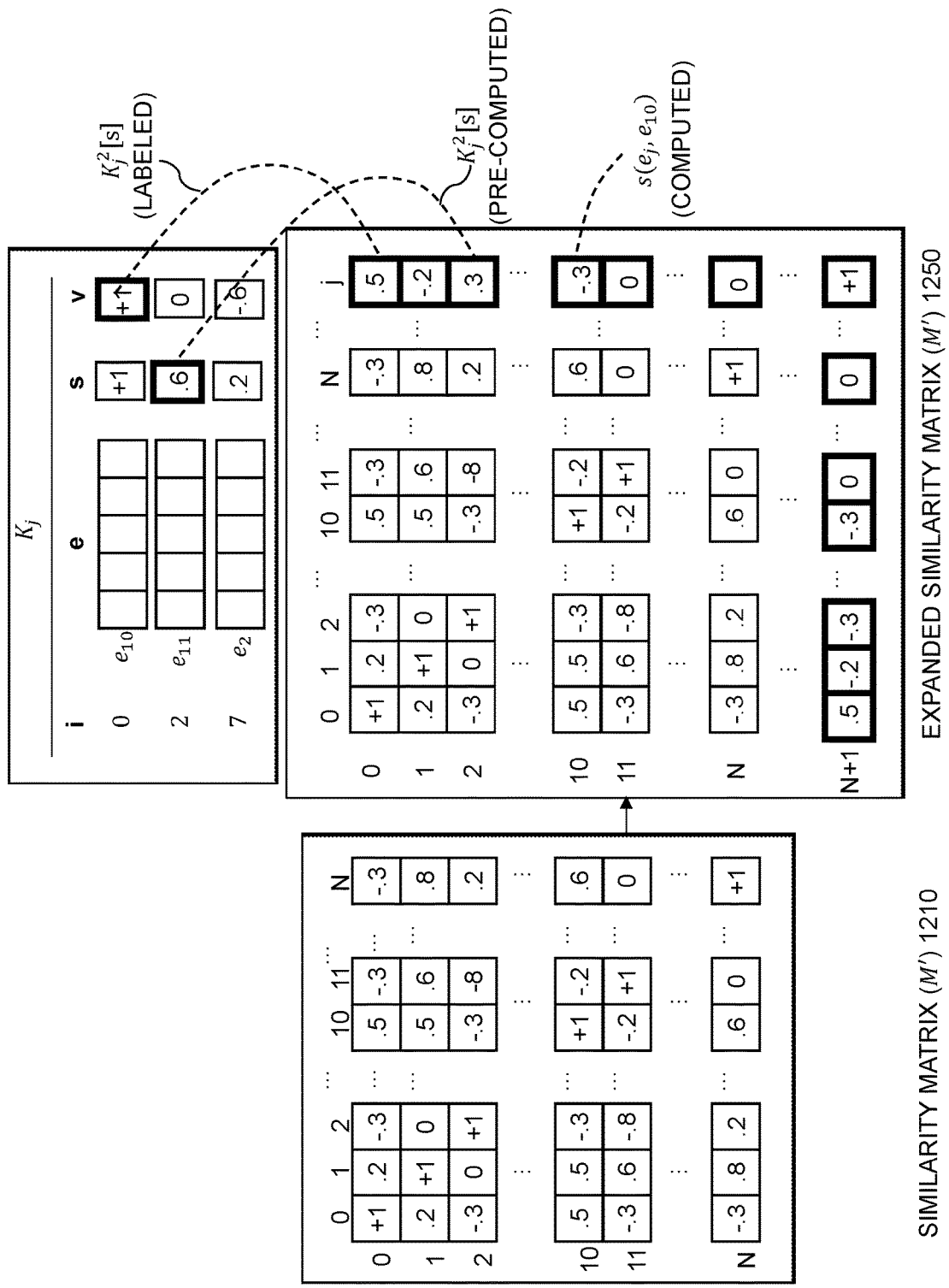
FIG. 12 illustrates an expansion of a similarity matrix with additional rows and columns comprising similarity values between preexisting customer service tickets and new customer service tickets in accordance with an illustrative embodiment.

FIG. 12 illustrates an expansion of a similarity matrix (M') with additional rows and columns comprising the similarity values between preexisting customer service tickets and new customer service tickets in accordance with an illustrative embodiment for a new ticket $t_j(j>N)$. In the example of FIG. 12, the similarity matrix (M') 1210 is expanded to add a row and a column for a new ticket $t_{N+1}$, where the cells of the expanded similarity matrix (M') 1250 are shown with a highlighted outline. The similarities between the new customer service ticket $t_j$ and a given preexisting customer service ticket $t_i$, for $i \leq N$, must be computed using the same similarity scoring function as used in the preprocessing stage and in the candidate scoring query (again, typically, the cosine similarity).

It is noted, however, that the similarities between a new ticket $t_j$ and its candidate tickets $K_j^a$, $K_j^b$, ... are precomputed as part of the structure $K_j$. Moreover, for some of those candidates, a label $K_j^a[v]$, $K_j^b[v]$, . . . may be available. Thus, the following are determined:

$$M'_{j,a} = \begin{cases} K_j^a[v], & \text{if } a \in K_j \text{ and } K_j^a[v] \text{ defined} \\ K_j^a[s], & \text{if } a \in K_j \text{ and } K_j^a[v] \text{ not defined} \\ s(e_j, e_a), & \text{otherwise} \end{cases}$$

It is also noted that this process can be performed for every $K_j \in K$ in a batch embodiment in which operator revisions are accumulated before the encoding revision process takes place (in a similar manner as the adjustment of preexisting similarities in M').

To avoid explosive growth of the matrix M' over time (as the method is continually applied), several strategies may be adopted to curb the size of the matrix M'. An active pruning process may be performed in one or more embodiments to eliminate rows/columns corresponding to tickets that satisfy one or more of the following exemplary ticket pruning criteria:
- tickets that are too old (e.g., based on a timestamp of creation and last update);
- tickets that rarely appear in any candidate-selection query; or alternatively tickets whose encoding determines a very low level of similarity to all other tickets in M'; and/or
- an encoding of a ticket determines a very high similarity to another ticket, and close similarity scores to the other tickets as that ticket (i.e., two nearly identical rows/columns).

It is also noted that that the parts of the pruning and reducing process may also be performed constructively, as part of the process for adding new tickets described above.

Recall that the similarity checking process requires that the input tickets are transformed into a vector space (e.g., by an encoding process) where similarity metrics can be computed more easily and efficiently. At the beginning of this process, encodings are obtained solely from contextual relationships between words present in the tickets. As seen above, however, corrections (or other feedback) provided by the user can be leveraged in situations where the initially obtained encodings do not yield acceptable similarity results related to the problem domain (i.e., ticket resolution).

To leverage such user corrections, a new modelling approach is provided in which the objective is to obtain encodings that lead to better similarity results. In the initial modelling approach, a self-supervised learning method (e.g., a Doc2Vec approach) is used. In the disclosed encoding revision model, a supervised learning approach is used.

Figure 13:
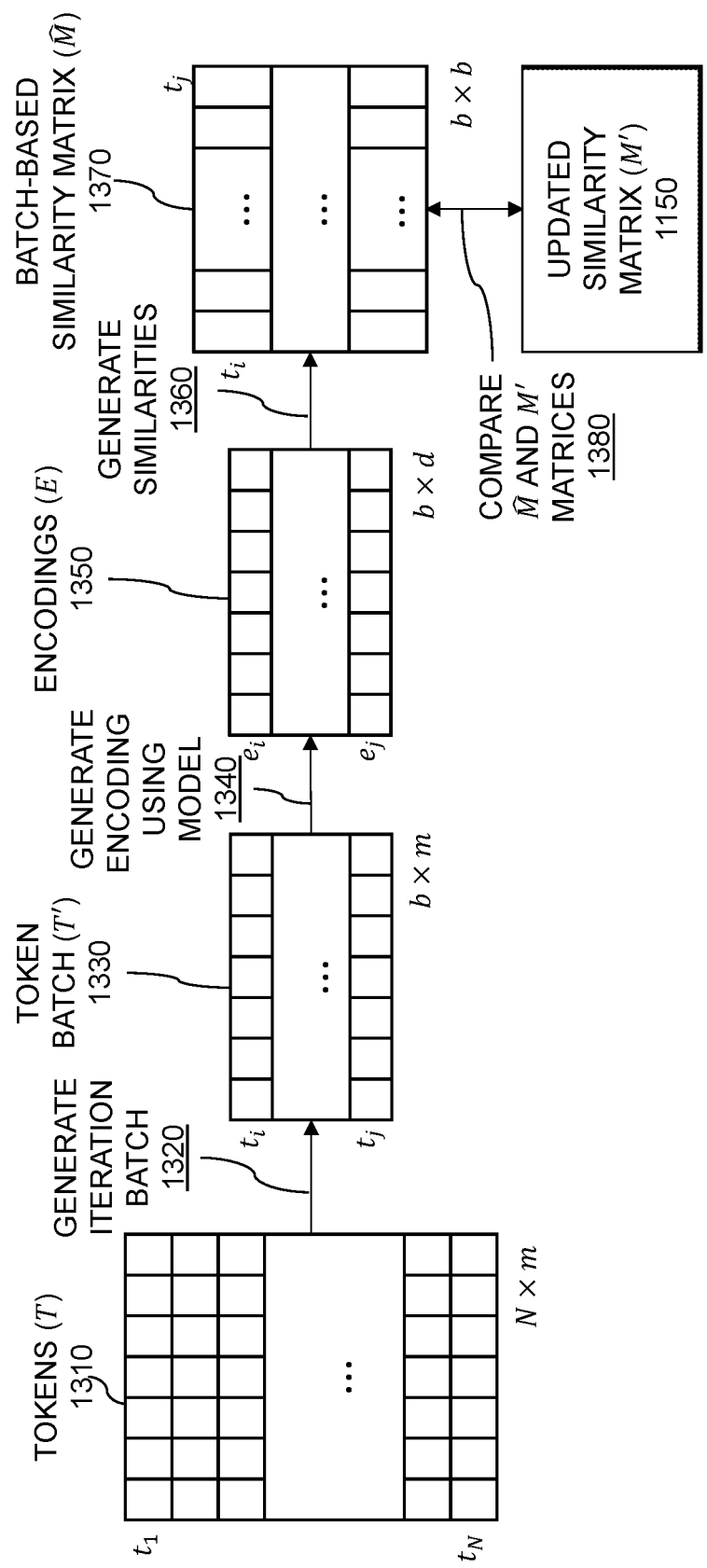
FIG. 13 is a flow chart illustrating an exemplary implementation of a process for updating an encoding model based on similarity feedback obtained from a user in accordance with an illustrative embodiment.

FIG. 13 is a flow chart illustrating an exemplary implementation of a process for updating an encoding model based on similarity feedback obtained from at least one user in accordance with an illustrative embodiment. In the example of FIG. 13, tokens, T, 1310 of each historical customer service ticket (together with any corresponding similarity feedback obtained from a user) are obtained and an iteration batch of the tokens 1310 is generated at step 1320 to create a token batch, T', 1330. The token batch, T', 1330 is processed at step 1340 to generate an encoding, E, 1350 of each token, T, in the current token batch, T', 1330 using the current encoding model. The pairwise similarity of the token, T, in the current token batch, T', 1330 are generated at step 1360, to provide a batch-based similarity matrix, $\hat{M}$, 1370.

The batch-based similarity matrix, $\hat{M}$, 1370 is compared at step 1380 to the updated similarity matrix, M', 1150 (e.g., the prior version) before being updated to reflect the new similarity feedback obtained from the at least one user. In this manner, the encoding model is updated by the back propagation of a loss computed using a loss function to address any differences between the similarity matrix, M', and the similarity matrix, $\hat{M}$, in accordance with a supervised learning approach.

In some embodiments, the disclosed techniques train a new encoding model that generates encodings that yield similarity matrices, $\hat{M}$, that iteratively approximate M' by means of the optimization process of the training. For each training epoch (e.g., each iteration), a batch of ticket tokens of size b, T', is obtained from the original customer service ticket database and is transformed by an encoding model into corresponding encodings, E. The encoding model may be implemented, for example, as deep neural network, in a similar manner as the Doc2Vec model. From the corresponding encodings, E, pairwise similarities $\text{sim}(\hat{e}_i, \hat{e}_j)$ are computed into the similarity matrix, $\hat{M}$, and compared with the prior similarity matrix, M'.

The comparison between the two matrices, $\hat{M}$ and M', is defined via a loss function, $\text{loss}(\hat{y}, y)$, where $\hat{y}$ is an aggregate value obtained from $\hat{M}$, of size b×b, for all tickets in the batch of size b, and y is an aggregate value obtained from M' for the same tickets found in the matrix, expressed as follows:

$$\hat{y}_l = \frac{1}{b}\sum_{j=1}^{b} \hat{M}(i, j)$$

$$y_k = \frac{1}{b}\sum_{l=1}^{b} M'(k, l)$$

$$\text{loss}(\hat{y}, y) = \frac{1}{b}\sum_{i=1}^{b} (\hat{y}_l - y_{k(i)})^2$$

Generally, $\hat{y}_l$ is the average similarity value between a given customer service ticket, $t_i$, and all other customer service tickets in the similarity matrix, $\hat{M}$. Similarly, $y_i$ is the average similarity value between the same customer service ticket, $t_i$, and all other customer service tickets in M'.

Figure 14:
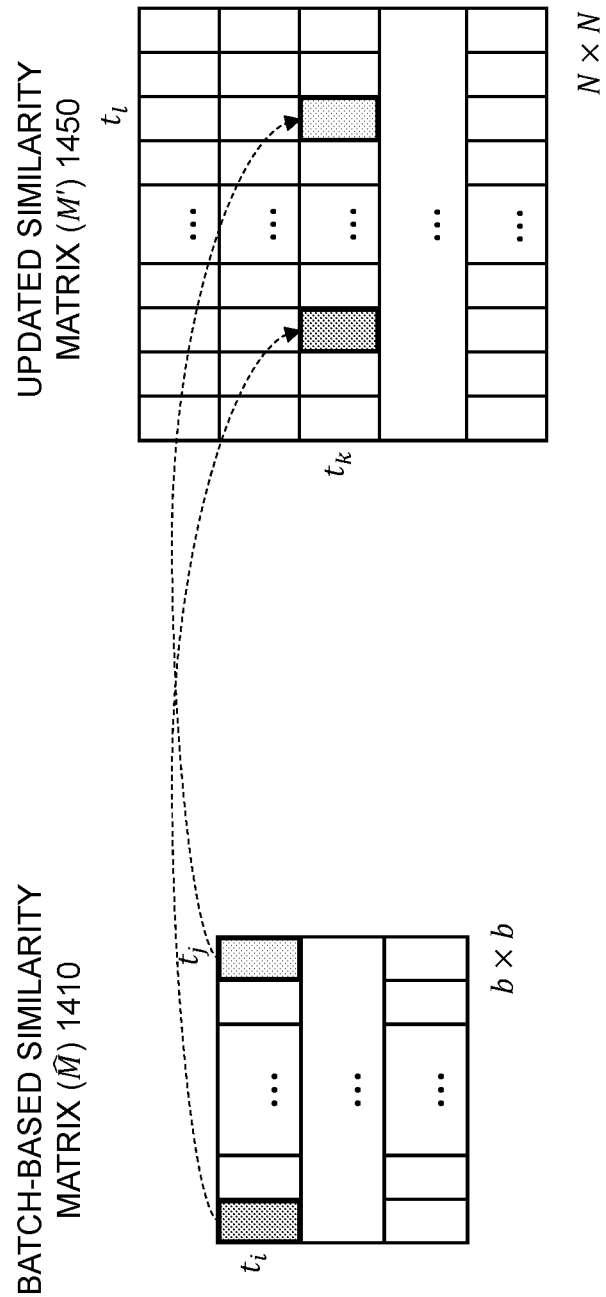
FIG. 14 illustrates an exemplary implementation of a process for finding equivalent customer service tickets in a batch of customer service tickets processed by the process of FIG. 13 and in the original data in accordance with an illustrative embodiment.

It is noted, however, that, the similarity matrix, M', is a n N×N matrix, where N is, for example, the totality of customer service tickets, and the similarity matrix, the similarity matrix, $\hat{M}$, is a batch of customer service tickets. FIG. 14 illustrates an exemplary implementation of a process for finding equivalent customer service tickets in a batch-based similarity matrix, $\hat{M}$, 1410 corresponding to customer service tickets processed by the process of FIG. 13 and in the larger original data of the updated similarity matrix, M', 1450, in accordance with an illustrative embodiment. In the example of FIG. 14, the process identifies the customer service tickets in the larger similarity matrix, M', 1450 corresponding to the customer service tickets in the similarity matrix, $\hat{M}$, 1410 for the current training batch, so that $\hat{M}(i,j)$ is matched with M'(k,l).

As users provide more revisions to matrix M', with additional feedback regarding the accuracy of the generated similarity values, the process of FIG. 13 is repeated so that new ticket encodings are generated by the model until the similarities are adjusted to satisfy the user revisions.

In one or more embodiments, the disclosed ticket similarity determination techniques address a cold-start effect by generating initial encodings to satisfy contextual similarities, while user input is not available. Once such input is available, the disclosed techniques transition to the training approach of FIG. 13.

Figure 15:
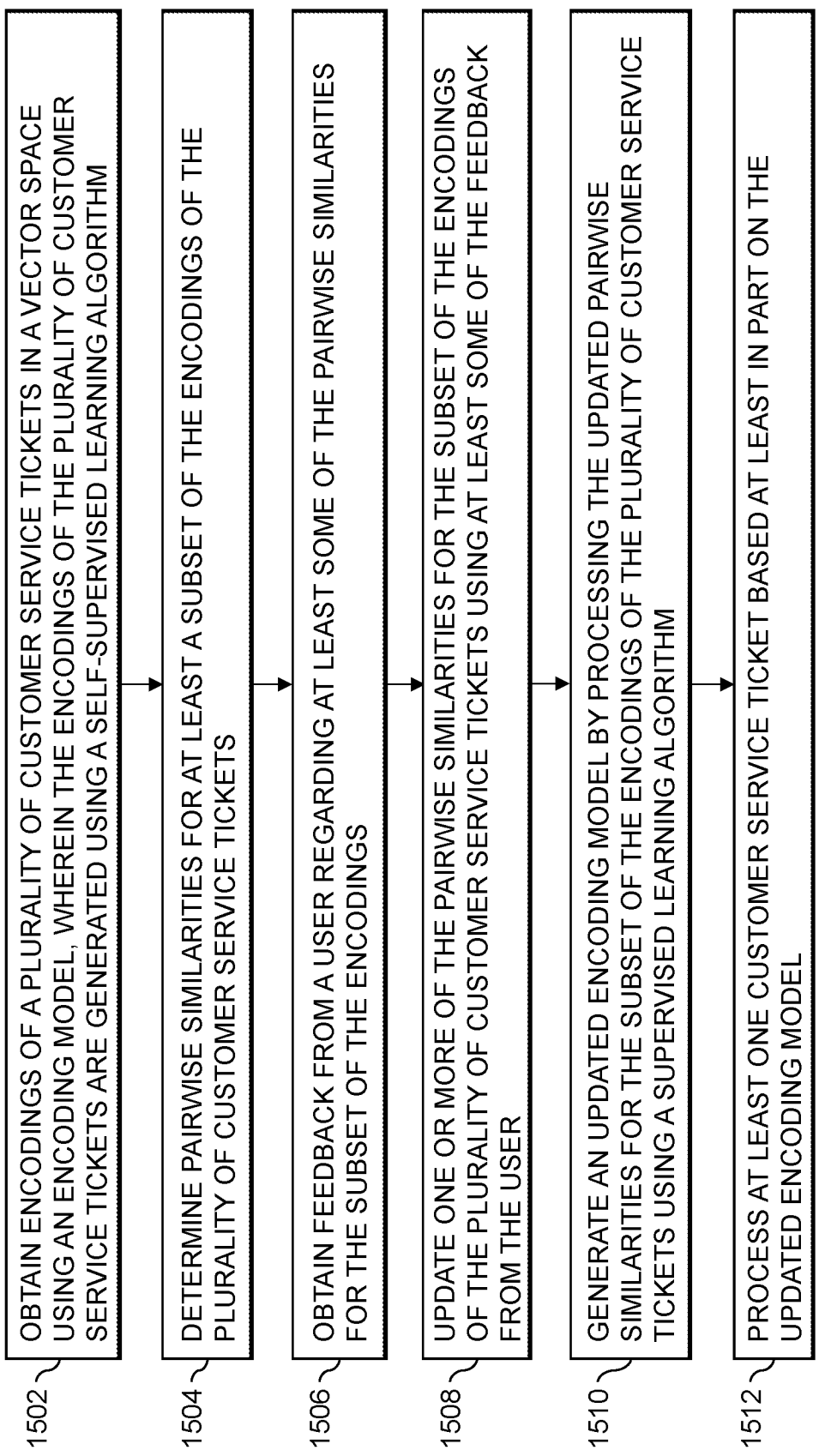
FIG. 15 is a flow chart illustrating an exemplary implementation of a process for customer service ticket similarity determination using an updated encoding model in accordance with an illustrative embodiment.

FIG. 15 is a flow chart illustrating an exemplary implementation of a process for customer service ticket similarity determination using an updated encoding model based on similarity feedback from a user in accordance with an illustrative embodiment. In the example of FIG. 15, encodings of a plurality of customer service tickets are obtained in step 1502 in a vector space using an encoding model, wherein the encodings of the plurality of customer service tickets are generated using a self-supervised learning algorithm.

In step 1504, pairwise similarities are determined for at least a subset of the encodings of the plurality of customer service tickets. Feedback is obtained from a user in step 1506 regarding at least some of the pairwise similarities for the subset of the encodings. In step 1508, the process of FIG. 15 updates one or more of the pairwise similarities for the subset of the encodings of the plurality of customer service tickets using at least some of the feedback from the user.

An updated encoding model is generated in step 1510 by processing the updated pairwise similarities for the subset of the encodings of the plurality of customer service tickets using a supervised learning algorithm, and in step 1512, at least one customer service ticket is processed based at least in part on the updated encoding model.

In one or more embodiments, the obtaining the encodings of the plurality of customer service tickets in the vector space in step 1502 further comprises obtaining tokenized versions of the plurality of customer service tickets. The updated encoding model may employ a neural network.

In at least some embodiments, the feedback from the user regarding the at least some pairwise similarities for the subset of the encodings indicates a similarity of two or more of the plurality of customer service tickets. The generating the updated encoding model in step 1510 may comprise, for a given training epoch of a plurality of training epochs, obtaining a batch (e.g., a random batch) of customer service tickets from the plurality of customer service tickets and transforming the batch of customer service tickets into encodings using a current encoding model. The generating the updated encoding model in step 1510 may also comprise (i) determining pairwise similarities for the encodings of the batch of customer service tickets; (ii) generating a first aggregate similarity value obtained from the pairwise similarities for the encodings of the batch of customer service tickets; and (iii) generating a second aggregate similarity value obtained from the pairwise similarities for the encodings of the corresponding customer service tickets in the plurality of customer service tickets. In addition, the generating the updated encoding model in step 1510 may further comprise evaluating a loss function using the first aggregate similarity value and the second aggregate similarity value and applying a supervised learning algorithm to fit the encoding model with respect to the loss function.

In some embodiments, the processing the at least one customer service ticket based at least in part on the updated encoding model further comprises: generating an encoding of the at least one customer service ticket using the updated encoding model; determining pairwise similarities for the encoding of the at least one customer service ticket and one or more of the subset of the encodings of the plurality of customer service tickets; and identifying one or more customer service tickets of the plurality of customer service tickets that are similar to the at least one customer service ticket based at least in part on a similarity score.

One or more closing notes regarding a disposition of the at least one customer service ticket may be encoded into the encoding of the at least one customer service ticket using the updated encoding model. The plurality of customer service tickets may be pruned based at least in part on one or more of: an age of a given customer service ticket; a frequency with which the given customer service ticket appears in a candidate selection query; one or more rules regarding the pairwise similarity of the given customer service ticket to other customer service tickets in the plurality of customer service tickets.

The particular processing operations and other functionality described in conjunction with FIGS. 2, 13 and 15, for example, are presented by way of illustrative example only, and should not be construed as limiting the scope of the disclosure in any way. Alternative embodiments can use other types of processing operations for customer service ticket similarity determination using an updated encoding model based on similarity feedback from a user. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In this manner, in one or more embodiments, the disclosed ticket similarity determination techniques find relationships within the support ticket data so that new incidents are solved more efficiently by leveraging previous solutions. The disclosed ticket similarity determination approach does not require any particular specific set of fields, and is adaptable to any number of fields, such as message and/or note fields that are typically present in such systems.

In at least some embodiments, the disclosed ticket similarity determination methodology identifies support tickets that have already been closed with a solution by encoding the ticket description and searching for similarities in the encoded space. The most similar previous tickets can be provided, for example, in a ranked manner, for review by a human operator. The review and analysis of the human operator is then be leveraged to fine-tune the weights of the encoding process for future support issues.

The disclosed ticket similarity determination framework suggests previous tickets that are similar to a new ticket without the need for any initial supervised dataset. The framework then leverages available human revision (e.g., feedback from the user indicating whether prior results were accurate), resulting from normal operation guided by the disclosed approach, to adjust the weights of the features in the similarity metric.

One or more embodiments of the disclosure provide improved methods, apparatus and computer program products for customer service ticket similarity determination using an updated encoding model based on similarity feedback from a user. The foregoing applications and associated embodiments should be considered as illustrative only, and numerous other embodiments can be configured using the techniques disclosed herein, in a wide variety of different applications.

It should also be understood that the disclosed ticket similarity determination techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed ticket similarity determination techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based ticket similarity determination engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based ticket similarity determination platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 16 and 17. These platforms may also be used to implement at least portions of other information processing systems in other embodiments.

Figure 16:
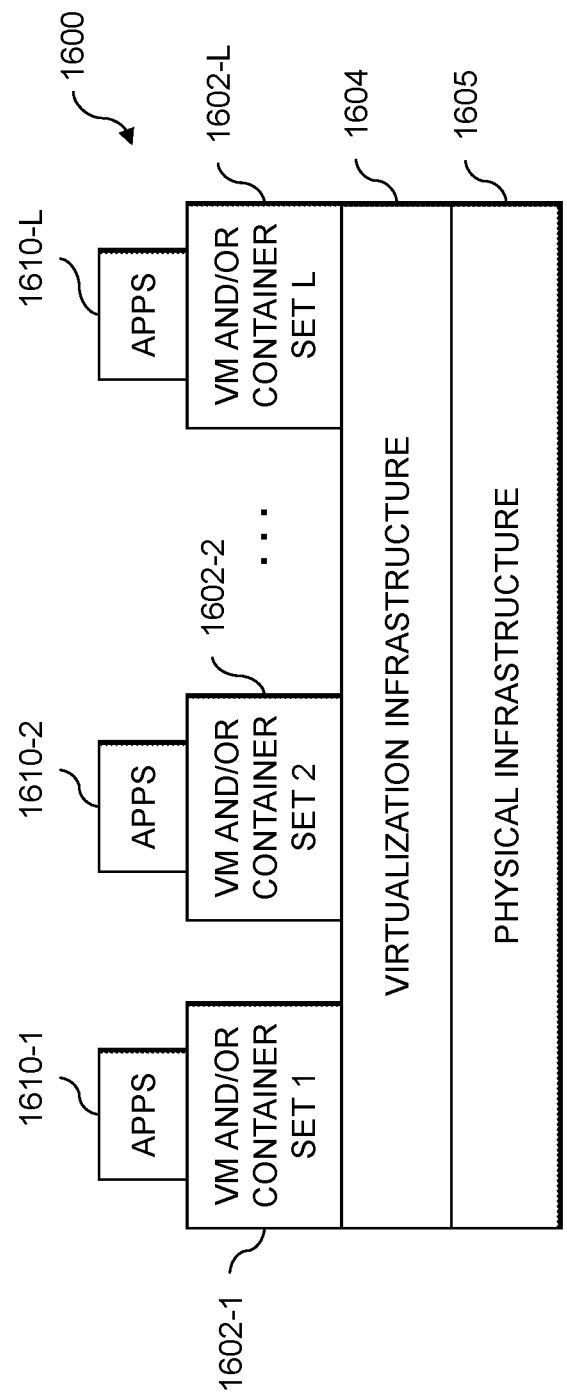
FIG. 16 illustrates an exemplary processing platform that may be used to implement at least a portion of one or more embodiments of the disclosure comprising a cloud infrastructure.

FIG. 16 shows an example processing platform comprising cloud infrastructure 1600. The cloud infrastructure 1600 comprises a combination of physical and virtual processing resources that may be utilized to implement at least a portion of the information processing system 100. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. Such implementations can provide ticket similarity determination functionality of the type described above for one or more processes running on a given one of the VMs. For example, each of the VMs can implement ticket similarity determination control logic and associated encoding model update functionality for one or more processes running on that particular VM.

An example of a hypervisor platform that may be used to implement a hypervisor within the virtualization infrastructure 1604 is the VMware® vSphere® which may have an associated virtual infrastructure management system such as the VMware® vCenter™. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system. Such implementations can provide ticket similarity determination functionality of the type described above for one or more processes running on different ones of the containers. For example, a container host device supporting multiple containers of one or more container sets can implement one or more instances of ticket similarity determination control logic and associated encoding model update functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises at least a portion of the given system and includes a plurality of processing devices, denoted 1702-1, 1702-2, 1702-3, . . . 1702-K, which communicate with one another over a network 1704. The network 1704 may comprise any type of network, such as a WAN, a LAN, a satellite network, a telephone or cable network, a cellular network, a wireless network such as WiFi or WiMAX, or various portions or combinations of these and other types of networks.

The processing device 1702-1 in the processing platform 1700 comprises a processor 1710 coupled to a memory 1712. The processor 1710 may comprise a microprocessor, a microcontroller, an ASIC, an FPGA or other type of processing circuitry, as well as portions or combinations of such circuitry elements, and the memory 1712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and the given system may include additional or alternative processing platforms, as well as numerous distinct processing platforms in any combination, with each such platform comprising one or more computers, storage devices or other processing devices.

Figure 17:
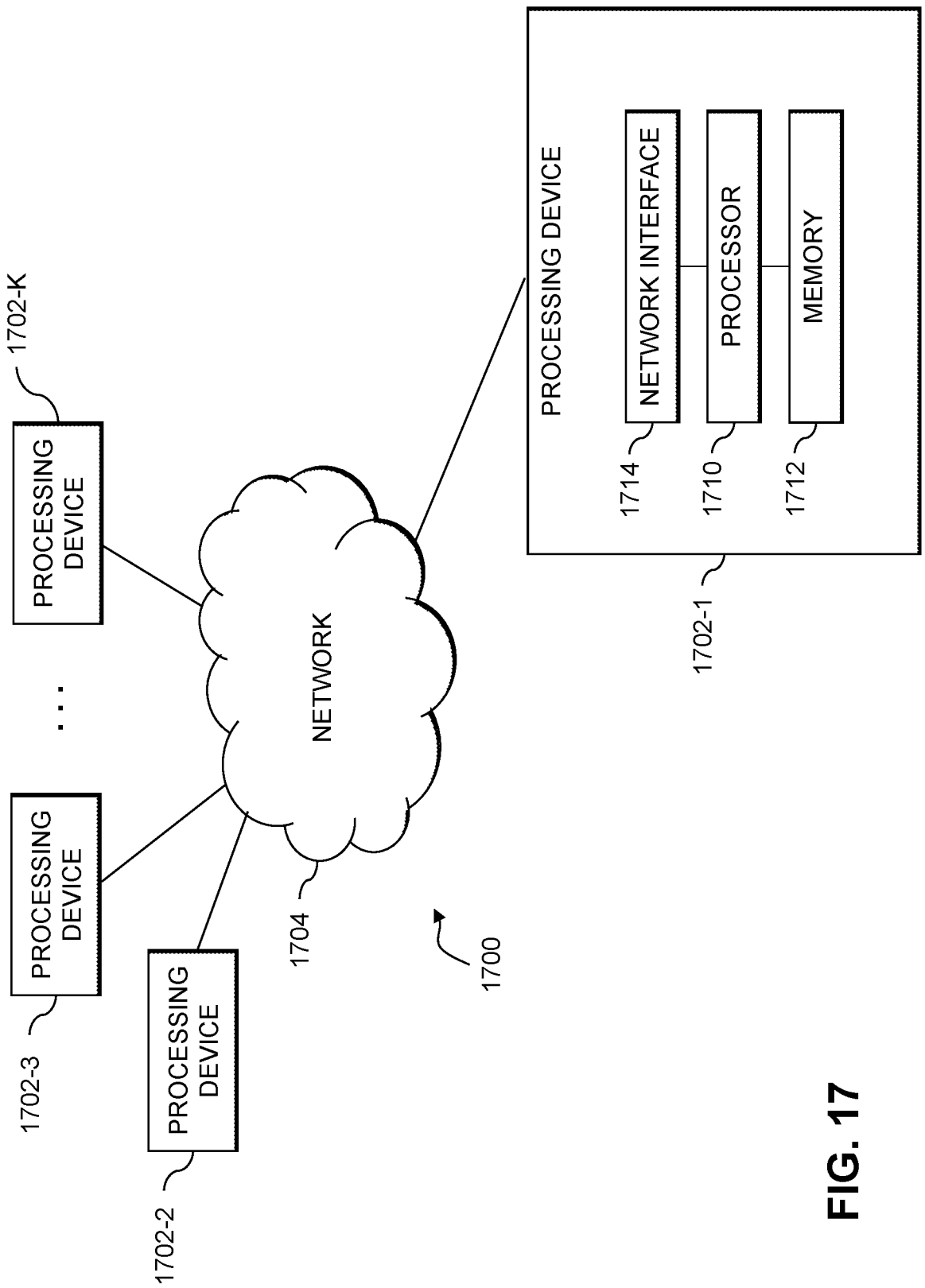
FIG. 17 illustrates another exemplary processing platform that may be used to implement at least a portion of one or more embodiments of the disclosure.

Multiple elements of an information processing system may be collectively implemented on a common processing platform of the type shown in FIG. 16 or 17, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   tokenizing a plurality of customer service tickets to generate a plurality of tokenized customer service tickets, wherein the plurality of tokenized customer service tickets comprise textual tokens;
   obtaining encodings of the plurality of tokenized customer service tickets in a vector space using an encoding model, wherein the encoding model is trained in a first training stage to learn, using at least one machine learning model, an encoding function from a first set of training data, wherein the encodings of the plurality of tokenized customer service tickets are generated using a self-supervised learning algorithm;
   determining, using at least one processing device, pairwise similarities for at least a subset of the encodings of the plurality of tokenized customer service tickets;
   obtaining feedback from a user regarding at least some of the pairwise similarities for the subset of the encodings;
   updating, using the at least one processing device, one or more of the pairwise similarities for the subset of the encodings of the plurality of tokenized customer service tickets, using at least some of the feedback from the user, to create a second set of training data;
   generating, using the at least one processing device and the second set of training data, an updated encoding model in a second training stage by processing the updated pairwise similarities for the subset of the encodings of the plurality of tokenized customer service tickets using a supervised learning algorithm, wherein the generating the updated encoding model comprises, for a given training epoch of a plurality of training epochs, obtaining a batch of tokenized customer service tickets from the plurality of tokenized customer service tickets; transforming the batch of tokenized customer service tickets into encodings using a current encoding model; determining pairwise similarities for the encodings of the batch of tokenized customer service tickets; generating a first aggregate similarity value obtained from the pairwise similarities for the encodings of the batch of tokenized customer service tickets; generating a second aggregate similarity value obtained from the pairwise similarities for the encodings of the corresponding tokenized customer service tickets in the plurality of tokenized customer service tickets; and evaluating a loss function using the first aggregate similarity value and the second aggregate similarity value and applying a supervised learning algorithm to fit the updated encoding model with respect to the loss function; and processing, using the at least one processing device, at least one tokenized customer service ticket based at least in part on the updated encoding model;

wherein the at least one processing device comprises a processor coupled to a memory.

2. The method of claim 1, wherein the obtaining the encodings of the plurality of customer service tickets in the vector space further comprises obtaining tokenized versions of the plurality of customer service tickets.

3. The method of claim 1, wherein the updated encoding model employs a neural network.

4. The method of claim 1, wherein the feedback from the user regarding the at least some pairwise similarities for the subset of the encodings indicates a similarity of two or more of the plurality of customer service tickets.

5. The method of claim 1, wherein the processing the at least one customer service ticket based at least in part on the updated encoding model further comprises:
 generating an encoding of the at least one customer service ticket using the updated encoding model;
 determining pairwise similarities for the encoding of the at least one customer service ticket and one or more of the subset of the encodings of the plurality of customer service tickets; and
 identifying one or more customer service tickets of the plurality of customer service tickets that are similar to the at least one customer service ticket based at least in part on a similarity score.

6. The method of claim 1, further comprising encoding one or more closing notes regarding a disposition of the at least one customer service ticket into the encoding of the at least one customer service ticket using the updated encoding model.

7. The method of claim 1, further comprising pruning the plurality of customer service tickets based at least in part on one or more of: an age of a given customer service ticket; a frequency with which the given customer service ticket appears in a candidate selection query; and one or more rules regarding the pairwise similarity of the given customer service ticket relative to other customer service tickets in the plurality of customer service tickets.

8. A non-transitory processor-readable storage medium having stored therein program code of one or more software programs, wherein the program code when executed by at least one processing device causes the at least one processing device to perform the following steps:
 tokenizing a plurality of customer service tickets to generate a plurality of tokenized customer service tickets, wherein the plurality of tokenized customer service tickets comprise textual tokens;
 obtaining encodings of the plurality of tokenized customer service tickets in a vector space using an encoding model, wherein the encoding model is trained in a first training stage to learn, using at least one machine learning model, an encoding function from a first set of training data, wherein the encodings of the plurality of tokenized customer service tickets are generated using a self-supervised learning algorithm;
 determining, using at least one processing device, pairwise similarities for at least a subset of the encodings of the plurality of tokenized customer service tickets;
 obtaining feedback from a user regarding at least some of the pairwise similarities for the subset of the encodings;
 updating, using the at least one processing device, one or more of the pairwise similarities for the subset of the encodings of the plurality of tokenized customer service tickets, using at least some of the feedback from the user, to create a second set of training data;
 generating, using the at least one processing device and the second set of training data, an updated encoding model in a second training stage by processing the updated pairwise similarities for the subset of the encodings of the plurality of tokenized customer service tickets using a supervised learning algorithm, wherein the generating the updated encoding model comprises, for a given training epoch of a plurality of training epochs, obtaining a batch of tokenized customer service tickets from the plurality of tokenized customer service tickets; transforming the batch of tokenized customer service tickets into encodings using a current encoding model; determining pairwise similarities for the encodings of the batch of tokenized customer service tickets; generating a first aggregate similarity value obtained from the pairwise similarities for the encodings of the batch of tokenized customer service tickets; generating a second aggregate similarity value obtained from the pairwise similarities for the encodings of the corresponding tokenized customer service tickets in the plurality of tokenized customer service tickets; and evaluating a loss function using the first aggregate similarity value and the second aggregate similarity value and applying a supervised learning algorithm to fit the updated encoding model with respect to the loss function; and
 processing, using the at least one processing device, at least one tokenized customer service ticket based at least in part on the updated encoding model.

9. The non-transitory processor-readable storage medium of claim 8, wherein the obtaining the encodings of the plurality of customer service tickets in the vector space further comprises obtaining tokenized versions of the plurality of customer service tickets.

10. The non-transitory processor-readable storage medium of claim 8, wherein the updated encoding model employs a neural network.

11. The non-transitory processor-readable storage medium of claim 8, wherein the feedback from the user regarding the at least some pairwise similarities for the subset of the encodings indicates a similarity of two or more of the plurality of customer service tickets.

12. An apparatus comprising:
 at least one processing device comprising a processor coupled to a memory;
 the at least one processing device being configured to implement the following steps:
 tokenizing a plurality of customer service tickets to generate a plurality of tokenized customer service tickets, wherein the plurality of tokenized customer service tickets comprise textual tokens;
 obtaining encodings of the plurality of tokenized customer service tickets in a vector space using an encoding model, wherein the encoding model is trained in a first training stage to learn, using at least one machine learning model, an encoding function from a first set of training data, wherein the encodings of the plurality of tokenized customer service tickets are generated using a self-supervised learning algorithm;

determining, using at least one processing device, pairwise similarities for at least a subset of the encodings of the plurality of tokenized customer service tickets;

obtaining feedback from a user regarding at least some of the pairwise similarities for the subset of the encodings;

updating, using the at least one processing device, one or more of the pairwise similarities for the subset of the encodings of the plurality of tokenized customer service tickets, using at least some of the feedback from the user, to create a second set of training data;

generating, using the at least one processing device and the second set of training data, an updated encoding model in a second training stage by processing the updated pairwise similarities for the subset of the encodings of the plurality of tokenized customer service tickets using a supervised learning algorithm, wherein the generating the updated encoding model comprises, for a given training epoch of a plurality of training epochs, obtaining a batch of tokenized customer service tickets from the plurality of tokenized customer service tickets; transforming the batch of tokenized customer service tickets into encodings using a current encoding model; determining pairwise similarities for the encodings of the batch of tokenized customer service tickets; generating a first aggregate similarity value obtained from the pairwise similarities for the encodings of the batch of tokenized customer service tickets; generating a second aggregate similarity value obtained from the pairwise similarities for the encodings of the corresponding tokenized customer service tickets in the plurality of tokenized customer service tickets; and evaluating a loss function using the first aggregate similarity value and the second aggregate similarity value and applying a supervised learning algorithm to fit the updated encoding model with respect to the loss function; and processing, using the at least one processing device, at least one tokenized customer service ticket based at least in part on the updated encoding model.

13. The apparatus of claim 12, wherein the obtaining encodings of the plurality of customer service tickets in the vector space further comprises obtaining tokenized versions of the plurality of customer service tickets.

14. The apparatus of claim 12, wherein the updated encoding model employs a neural network.

15. The apparatus of claim 12, wherein the feedback from the user regarding the at least some pairwise similarities for the subset of the encodings indicates a similarity of two or more of the plurality of customer service tickets.

16. The non-transitory processor-readable storage medium of claim 8, wherein the processing the at least one customer service ticket based at least in part on the updated encoding model further comprises:
generating an encoding of the at least one customer service ticket using the updated encoding model;
determining pairwise similarities for the encoding of the at least one customer service ticket and one or more of the subset of the encodings of the plurality of customer service tickets; and
identifying one or more customer service tickets of the plurality of customer service tickets that are similar to the at least one customer service ticket based at least in part on a similarity score.

17. The non-transitory processor-readable storage medium of claim 8, further comprising encoding one or more closing notes regarding a disposition of the at least one customer service ticket into the encoding of the at least one customer service ticket using the updated encoding model.

18. The non-transitory processor-readable storage medium of claim 8, further comprising pruning the plurality of customer service tickets based at least in part on one or more of: an age of a given customer service ticket; a frequency with which the given customer service ticket appears in a candidate selection query; and one or more rules regarding the pairwise similarity of the given customer service ticket relative to other customer service tickets in the plurality of customer service tickets.

19. The apparatus of claim 12, further comprising encoding one or more closing notes regarding a disposition of the at least one customer service ticket into the encoding of the at least one customer service ticket using the updated encoding model.

20. The apparatus of claim 12, further comprising pruning the plurality of customer service tickets based at least in part on one or more of: an age of a given customer service ticket; a frequency with which the given customer service ticket appears in a candidate selection query; and one or more rules regarding the pairwise similarity of the given customer service ticket relative to other customer service tickets in the plurality of customer service tickets.

* * * * *